United States Patent
Amano et al.

[11] Patent Number: 6,084,649
[45] Date of Patent: Jul. 4, 2000

[54] TRISTABLE LIQUID CRYSTAL DISPLAY DEVICE

[75] Inventors: Takashi Amano, Yokohama, Japan;
Michael P. Keyes, Minneapolis, Minn.;
Steven J. Martin, Shoreview, Minn.;
Marc D. Radcliffe, Newport, Minn.;
Patricia M. Savu, Maplewood, Minn.;
Daniel C. Snustad, Woodbury, Minn.

[73] Assignee: 3M Innovative Properties Company, St. Paul, Minn.

[21] Appl. No.: 09/131,585

[22] Filed: Aug. 10, 1998

[51] Int. Cl.[7] .................... G02F 1/1335; G02F 1/1337; C09K 19/02; C09K 19/52; C09K 19/34
[52] U.S. Cl. ................. 349/96; 252/299.61; 252/299.01; 252/299.6; 349/123; 349/184
[58] Field of Search ............................ 252/299.6, 299.01, 252/299.61; 349/123, 96, 184

[56] References Cited

U.S. PATENT DOCUMENTS

| | | | |
|---|---|---|---|
| 4,367,924 | 1/1983 | Clark et al. | 350/334 |
| 4,886,619 | 12/1989 | Janulis | 252/299.1 |
| 5,078,477 | 1/1992 | Jono et al. | 359/91 |
| 5,082,587 | 1/1992 | Janulis | 252/299.1 |
| 5,254,747 | 10/1993 | Janulis | 568/650 |
| 5,262,082 | 11/1993 | Janulis et al. | 252/299.1 |
| 5,377,033 | 12/1994 | Radcliffe | 359/75 |
| 5,399,291 | 3/1995 | Janulis et al. | 252/299.1 |
| 5,399,701 | 3/1995 | Janulis | 546/298 |
| 5,437,812 | 8/1995 | Janulis et al. | 252/299.1 |
| 5,474,705 | 12/1995 | Janulis et al. | 252/299.1 |
| 5,482,650 | 1/1996 | Janulis et al. | 252/299.1 |
| 5,559,620 | 9/1996 | Tanaka et al. | 359/78 |
| 5,587,106 | 12/1996 | Mizukami et al. | 252/299.61 |
| 5,631,752 | 5/1997 | Tanaka | 349/173 |
| 5,658,491 | 8/1997 | Kistner et al. | 252/299.1 |
| 5,685,491 | 11/1997 | Kistner et al. | 252/299.01 |
| 5,702,637 | 12/1997 | Johnson et al. | 252/299.61 |
| 5,855,812 | 1/1999 | Radcliffe et al. | 252/299.01 |
| 5,858,269 | 1/1999 | Shinjo et al. | 252/299.01 |
| 5,863,458 | 1/1999 | Miyata et al. | 252/299.01 |

FOREIGN PATENT DOCUMENTS

| | | | |
|---|---|---|---|
| 0 571 278 A1 | 11/1993 | European Pat. Off. | C09K 19/28 |
| 0 681 201 A2 | 11/1995 | European Pat. Off. | G02F 1/135 |
| 0 694 599 | 1/1996 | European Pat. Off. | |
| 0 755 993 A1 | 1/1997 | European Pat. Off. | C09K 19/34 |
| 0 811 867 A2 | 12/1997 | European Pat. Off. | G02F 1/1337 |
| 0 821 050 A1 | 1/1998 | European Pat. Off. | C09K 19/34 |
| 9-185061 | 7/1997 | Japan | G02F 1/1337 |
| WO 91/00897 | 1/1991 | WIPO | |

OTHER PUBLICATIONS

Collings, "Liquid Crystals: Natures Delicate Phase of Matter," pp. 100–103, (1990).

Collings, "Introduction to Liquid Crystals Chemistry and Physics," pp. 271–285, (1997).

Arakawa, "Novel Liquid Crystal Mixtures for a Surface–Stabilized Ferroelectric LDC," Liquid Crystals, vol. 23, No. 5, pp. 659–666, (1997).

(List continued on next page.)

*Primary Examiner*—C. H. Kelly
*Attorney, Agent, or Firm*—Kent S. Kokko

[57] ABSTRACT

A tristable liquid crystal display device comprises (a) first and second opposed substrates, at least one bearing an alignment coating and each bearing at least one electrode so as to define one or a plurality of pixels; (b) a tilted smectic or induced tilted smectic liquid crystal composition disposed between the substrates; and (c) a pair of orthogonally disposed polarizers, each having a polarization axis, one polarization axis being aligned with the zero field optical axis of a tilted smectic or induced tilted smectic mesophase of the liquid crystal composition; wherein the substrates are disposed so as to provide an alignment of the liquid crystal composition, which comprises (i) at least one chiral liquid crystal compound; and (ii) at least one achiral liquid crystal compound that can be represented by the following formula:

$$R—M—N—(P)_a—OCH_2R_f \qquad (I)$$

where R, M, N, P, a and $R_f$ are describe herein; wherein the liquid crystal composition exhibits tristable switching.

28 Claims, 2 Drawing Sheets

OTHER PUBLICATIONS

Seomun et al., "Evolution of Switching Characteristics from Tristable to V–Shaped in an Apparently Antiferroelectric Liquid Crystal," Japanese Journal of Applied Physics, vol. 36, Pt. 1, No. 6A, (1997).

Okada et al., "New Display Mode of Ferroelectric Liquid Crystals with Large Tilt Angle," Ferroelectrics, vol. 149, pp. 171–181, (1993).

Crossland et al., "Addressing Requirements for Chiral Smectic Liquid Crystal Active Backplane Spatial Light Modulators," Ferroelectrics, vol. 149, pp. 361–374, (1993).

Verhulst, "Analytical Modelling of Active–Matrix Driving of Liquid Crystals with Spontaneous Polarization," Japanese Journal of Applied Physics, vol. 36, pp. 720–729, (1997).

Dijon, "Ferroelectric LCD's in Liquid Crystals Applications and Uses," vol. 1, Birenda Bahadur ed., pp. 330–33, World Scientific Publishing Ltd., NJ, (1990).

Clark et al., "Submicrosecond Bistable Electro–Optic Switching in Liquid Crystals," Appl. Phys. Lett. 36, pp. 899–901, (1980).

Meyer et al., "Ferroelectric Liquid Crystals," J. Physique, 36, pp. 1–69, (1975).

Skarp et al., "Helical Pitches and Tilt Angles in Room Temperature Ferroelectric Chiral Smectic C Liquid Crystals," Japanese Journal of Applied Physics, vol. 22, No. 4, pp. 566–568, (1983).

Chandani et al., "Tristable Switching in Surface Stabilized Ferroelectric Liquid Crystals with a Large Spontaneous Polarization," Japanese Journal of Applied Physics, vol. 27, No. 5, pp. L–729–L732, (1988).

Inui et al., "Thresholdless Antiferroelectricity in Liquid Crystals and its Application to Displays," J. Mater. Chem., 6(4), pp. 671–673 (1996).

Arakawa et al., "Synthesis of Fluorine–Containing Ferroelectric Liquid Crystals," Mol. Cryst. Liq. Cryst., vol. 204, pp. 15–25, (1991).

Nohira et al., "Synthesis and Mesomorphic Properties of Ferroelectric Liquid Crystals with a Fluorinated Asymmetric Frame (1)," Mol. Cryst. Liq. Cryst., vol. 180B, pp. 379–388, (1990).

TRISTABLE LIQUID CRYSTAL DISPLAY DEVICE

FIELD OF THE INVENTION

This invention relates to liquid crystal display devices and to methods of driving such devices.

BACKGROUND OF THE INVENTION

Devices employing liquid crystals have found use in a variety of electrooptical applications, in particular those which require compact, energy-efficient, voltage-controlled light valves, e.g., watch and calculator displays, as well as the flat-panel displays found in portable computers and compact televisions. Liquid crystal displays have a number of unique characteristics, including low voltage and low power of operation, which make them the most promising of the non-emissive electrooptical display candidates currently available.

A recent advance in the liquid crystal art has been the utilization of tilted chiral smectic liquid crystals, one class of which are termed ferroelectric liquid crystals, in devices which give microsecond switching and bistable operation. Ferroelectric liquid crystals were discovered by R. B. Meyer et al. (J. Physique 36, 1–69 (1975).). A high speed optical switching phenomenon using a "surface-stabilized ferroelectric liquid crystal" (SSFLC) was discovered for the ferroelectric liquid crystals by N. A. Clark et al. (Appl. Phys. Lett. 36, 899 and U.S. Pat. No. 4,367,924).

Many new ferroelectric liquid crystals have been developed and their switching characteristics extensively tested. Although devices employing these materials exhibit high response speed and wide viewing angles, many problems remain in developing SSFLC devices. These problems have included insufficient threshold characteristics, unsatisfactory contrast (due to chevron defects), and insufficient bistability due to difficulties in controlling alignment.

More recently, antiferroelectric liquid crystals (AFLC), another class of tilted chiral smectic liquid crystals, have been developed. Antiferroelectric liquid crystals are switchable in a chiral smectic $C_A$ phase ($SC_A^*$ phase) in addition to the tilted chiral smectic C phase ($S_C^*$ phase) used in ferroelectric liquid crystal devices.

Devices employing antiferroelectric liquid crystals have been described by Chandani et. al (Japan J. of Applied Physics 27(5), L729–732 (1988).). Antiferroelectric liquid crystals used in these devices exhibit three stable states: two stable states under the influence of an electric field and a third antiferroelectric state in the absence of an electric field. Antiferroelectric liquid crystals are characterized by having a distinct threshold and a double hysteresis that allows for a memory effect in either of the driven states. Antiferroelectric liquid crystals can be easily switched and provide devices that have few defects and that allow for the recovery of alignment.

In an AFLC device, with no applied electric field, an AFLC composition has a layered structure comprising many smectic layers, with the molecules of each layer being tilted in a direction opposite to those of the adjacent layer such that the liquid crystal composition has no net polarization. The alternating molecular director also results in a uniform optical axis parallel to the layer normal of the smectic layers. When placed between a pair of crossed polarizers such that one of the polarization axes of the polarizers is aligned with the uniform optical axis of the composition, the device exhibits a dark state. When an electric field is applied, the liquid crystal orients to align the spontaneous polarization with the electric field, resulting in one of two bright states, depending on the polarity of the electric field. Tristable switching behavior has also been observed for twisted ferroelectric and deformed helix devices.

Although AFLC devices of the prior art have provided tristable switching, there remains a need in the art for liquid crystal display devices that can provide tristable switching, gradation display (grey scale), threshold control, hysteresis control, and fast response times, and that can be used in both small and large size displays. In addition, there remains a need in the art for liquid crystal display devices that overcome the limitations of the prior art as to polarization, threshold voltage control, and contrast.

SUMMARY OF THE INVENTION

Briefly, in one aspect, this invention provides a tristable liquid crystal display device comprising (a) first and second opposed substrates, at least one bearing an alignment coating and each bearing at least one electrode so as to define one or a plurality of pixels; (b) a tilted smectic or induced tilted smectic liquid crystal composition disposed between the substrates; and (c) a pair of orthogonally disposed polarizers, each having a polarization (or light transmission) axis, one polarization axis being aligned with the zero field optical axis of a tilted smectic or induced tilted smectic mesophase of the liquid crystal composition; wherein the substrates are disposed so as to provide an alignment of the liquid crystal composition, which comprises (i) at least one chiral liquid crystal compound (a "polarization additive"); and (ii) at least one achiral liquid crystal compound that can be represented by the following formula:

$$R\text{—}M\text{—}N\text{—}(P)_a\text{—}OCH_2R_f \qquad (I)$$

where M, N, and P are independently selected from the group consisting of aromatic, heteroaromatic, alicyclic, heteroalicyclic, substituted aromatic, substituted heteroaromatic, substituted alicyclic, and substituted heteroalicyclic rings, the individual rings being fused or non-fused, and the rings being connected with each other by a covalent bond or an organic linking group (which can optionally contain one or more heteroatoms); R is an alkyl group, an ahkenyl group, an alkoxy group, or an alkoxy alkylene group; a is an integer of 0 or 1; and $R_f$ is a perfluorcether group; wherein the liquid crystal composition exhibits tristable switching.

Preferably, M, N, and P are each independently selected from the group consisting of

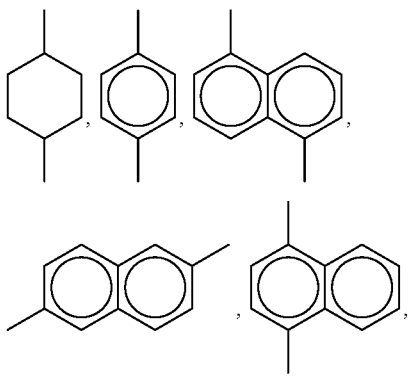

-continued

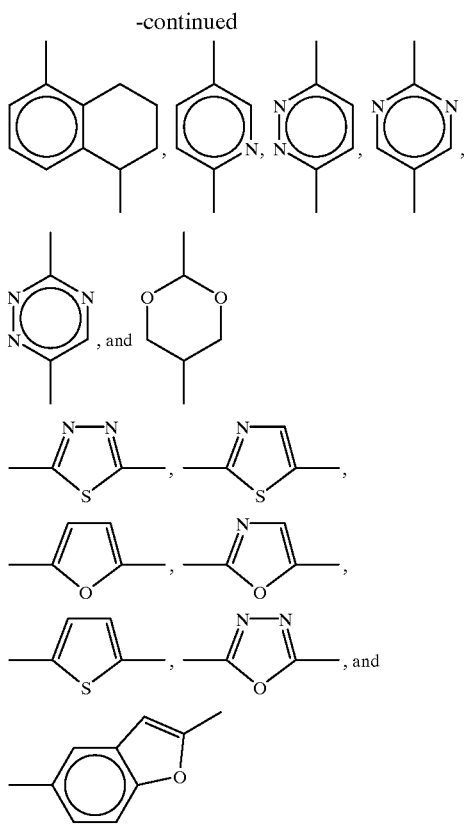

where one or more of the ring hydrogen atoms can be replaced with fluorine atoms; R has from about 4 to about 12 carbon atoms; and $R_f$ can be represented by the formula $(C_xF_{2x}O)_zC_yF_{2y+1}$, where x is independently an integer of 1 to about 10 for each $(C_xF_{2x}O)$, y is an integer of 1 to about 10, and z is an integer of 1 to about 4 (more preferably, an integer of 2 or 3). $R_f$ preferably has from about 5 to about 16 carbon atoms.

It has been discovered that the achiral liquid crystal compounds of Formula I above surprisingly exhibit latent tristable switching behavior. In other words, the achiral compounds do not exhibit such behavior alone, but, when in combination with a chiral component, such behavior can be observed. Tristable switching behavior can be induced by this achiral component even when the chiral component does not exhibit such behavior alone and even when the chiral component is used in small amounts. Surprisingly, the liquid crystal composition used in the device of the invention also generally exhibits low threshold voltages.

The liquid crystal display devices of the invention can provide tristable switching, gradation display (grey scale), threshold control, hysteresis control, and fast response times. The devices can be either passive or active matrix devices and can be used in both small and large size displays. Furthermore, relative to prior art devices, the devices of the invention exhibit improved polarization characteristics, improved threshold voltage control, and improved contrast.

In another aspect, this invention also provides a method of driving a tristable liquid crystal display device comprising the step of applying a voltage to the liquid crystal display device of the invention comprising the above-described liquid crystal composition, the voltage being sufficient to cause the zero field optical axis of the liquid crystal composition to shift from a zero field state (e.g., an antiferroelectric state) toward a ferroelectric state, resulting in a net tilt in the zero field optical axis.

BRIEF DESCRIPTION OF THE DRAWINGS

These and other features, aspects, and advantages of the present invention will become better understood with regard to the following description, appended claims, and accompanying drawings, wherein:

These figures, which are idealized, are not drawn to scale and are intended to be merely illustrative and nonlimiting.

DETAILED DESCRIPTION OF THE INVENTION

Figure 1:
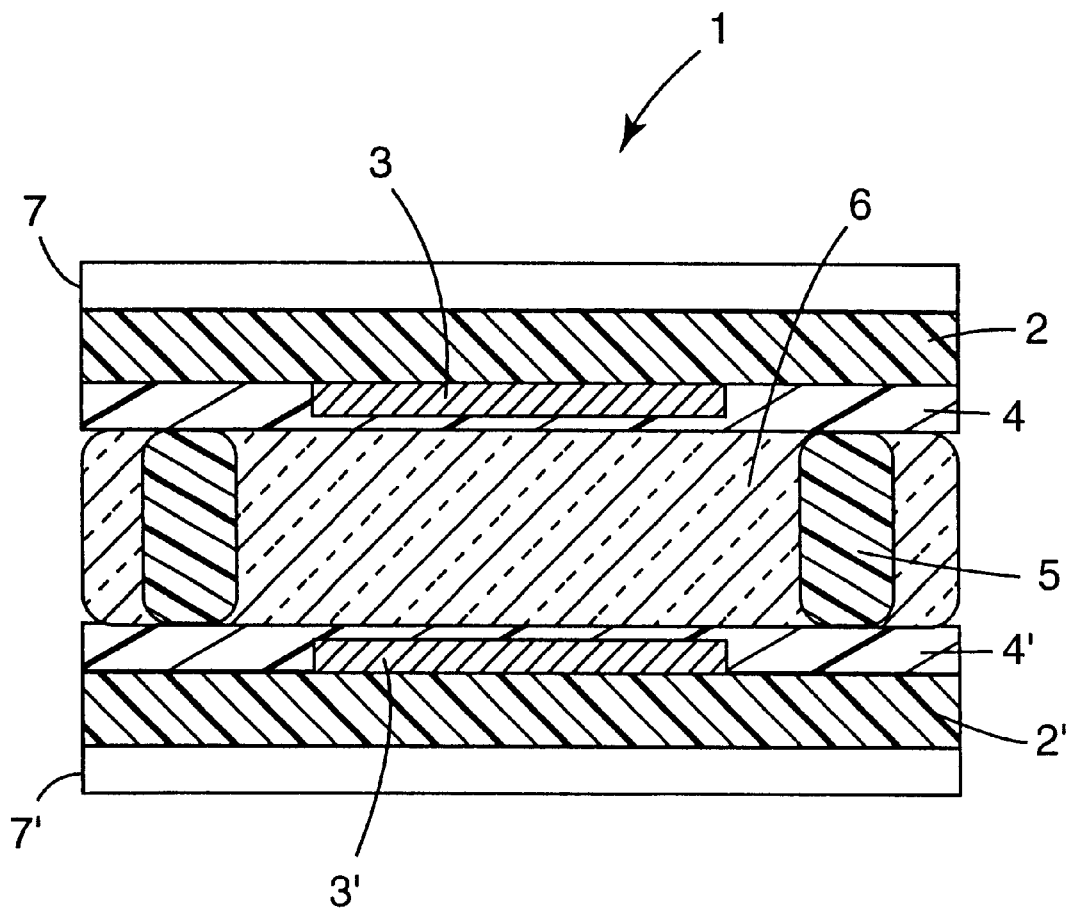
FIG. 1 shows a cross sectional view of an embodiment of the liquid crystal display device of the invention.

Referring to FIG. 1, an embodiment 1 of the tristable liquid crystal display device of the invention comprises two opposing substrates, 2 and 2', at least one of which is optically transparent. The opposing surfaces (inner surfaces that face each other) bear electrically conductive electrodes 3 and 3', at least one of which is transparent, mounted in a configuration so as to produce a desired pattern of pixels.

Substrates 2 and 2' can comprise any of the materials known in the art to be useful as substrates for liquid crystal display devices, e.g., glass or plastic. Electrodes 3 and 3' can be of any electrically conductive material, e.g., indium tin oxide (ITO), and can be applied to the surface of the substrates by any of the methods known in the art. Thus, the substrates can be coated with a film of $SnO_2$, $InO_3$, or ITO to form electrodes 3 and 3'.

Substrates 2 and 2' and the electrodes bear alignment coatings 4 and 4', which can comprise any of the useful alignment compositions known in the art. The two coatings can be the same or different. Materials suitable for use in preparing alignment coatings include polyvinyl alcohol, polyimide, polyamide-imide, polyester, polyamide, polyester-imide, polyparaxylylene, polycarbonate, polyvinyl acetal, polyvinyl chloride, polystyrene, polysiloxane, cellulose resin, melamine resin, urea resin, acrylic resin, and the like, and mixtures thereof. The surface of the alignment coatings 4 and 4' can be subjected to a prescribed (uniaxial) alignment treatment as desired, for example, by rubbing the surface with a fibrous material such as velvet, cloth, or paper.

Substrates 2 and 2' can be subjected to different alignment treatments in order to appropriately control an alignment state, particularly an initial alignment state. For example, one of the substrates can be provided with a rubbing-treated alignment coating, and the other can be provided with an alignment coating that is not subjected to rubbing and/or that comprises a composition that is different from that of the rubbing-treated alignment coating.

The liquid crystal device of the invention preferably has at least one alignment coating of sufficient thickness to optimize the tristable switching properties of the device. The coating preferably has a thickness of from about 50 to about 5000 angstroms, more preferably from about 50 to about 2500 angstroms, in order to provide good driving characteristics, high reliability, and driving stability in a wide temperature range.

Preferably, one of the alignment coatings of the device of the invention comprises a polyimide or polyamide (e.g., nylon) film. The film can generally be prepared by applying a polyamic acid (polyimide precursor) or polyamide solution to the surface of the substrate, heating the applied coating layer, and then subjecting the resulting alignment coating to a rubbing treatment. If desired, the device of the invention can utilize alignment treatments such as those described, e.g., in EP 755993 (Canon) and U.S. Pat. No. 5,377,033 (Radcliffe), the descriptions of which are incorporated herein by reference. The device of the invention can optionally further comprise an insulating layer (not shown in FIG. 1).

Substrates 2 and 2' bearing said alignment coatings 4 and 4' are separated by spacers 5 at a fixed distance (the "cell gap") that, along with the alignment coatings, allows for the alignment of a liquid crystal composition 6 that is contained in the resulting space between the substrates. The cell gap can generally be up to about 10 $\mu$, preferably from about 0.5 to about 5 $\mu$, in order for the device to exhibit tristable switching.

On the outer surfaces of substrates 2 and 2' are affixed orthogonally disposed polarizers 7 and 7', each having a polarization (or light transmission) axis. The polarizers can be of any design and material known in the art to be useful in liquid crystal display devices. The polarization axis of one of the polarizers is aligned with the zero field optical axis of a tilted or induced tilted smectic mesophase of the liquid crystal composition 6.

Chiral liquid crystal compounds suitable for use as polarization additives (component (i, of the liquid crystal composition used in the device of the invention) include both fluorinated and nonfluorinated chiral compounds (preferably fluorinated). Such compounds generally comprise two terminal portions and a central core connecting the terminal portions. Either terminal portion (or both) can be fluorinated and/or can contain a chiral moiety. The central core of the compounds typically comprises at least one or two rings independently selected from the group consisting of aromatic, heteroaromatic, alicyclic, heteroalicyclic, substituted aromatic, substituted heteroaromatic, substituted heteroalicyclic, and substituted alicyclic rings, the rings being connected one with another by a covalent bond or an organic linking group.

Suitable nonfluorinated polarization additives (chiral compounds having two terminal portions, neither of which is a fluorochemical terminal portion) are known in the art and have been described, e.g., by H. Nohira, S. Nakamura, and M. Kamei in "Synthesis And Mesomorphic Properties Of Ferroelectric Liquid Crystals With A Fluorinated Frame," Mol. Cryst. Liq. Cryst. 180B, 379–388 (1990); by D. Dijon in *Ferroelectric LCDs in Liquid Crystals: Applications and Uses*, Vol. 1, Birenda Bahadur, ed., pp. 330–333, World Scientific Publishing Ltd., New Jersey (1990); and by S. Arakawa, K. Nito, and J. Seto in "Synthesis Of Fluorine-Containing Ferroelectric Liquid Crystals," Mol. Cryst. Liq. Cryst. 204, 15–25 (1991).

Suitable fluorinated polarization additives (chiral compounds having two terminal portions, either (or both) of which is a fluorochemical terminal portion) are also known in the art. A useful class of such additives are those fluorine-containing liquid crystal compounds (comprising a fluorocarbon terminal portion; a chiral hydrocarbon or hydrocarbon ether terminal portion; and a central core connecting the terminal portions) described in U.S. Pat. Nos. 4,886,619 (Janulis), 5,254,747 (Janulis), and 5,399,701 (Janulis), the descriptions of which are incorporated herein by reference. Another useful class are those fluorine-containing liquid crystal compounds (comprising a fluoroether terminal portion; a chiral hydrocarbon or hydrocarbon ether terminal portion; and a central core connecting the terminal portions) described in U.S. Pat. Nos. 5,474,705 and 5,399,291 (Janulis), the descriptions of which are incorporated herein by reference.

Another useful class of fluorinated polarization additives are those fluorine-containing liquid crystal compounds (comprising a chiral fluorochemical terminal portion optionally containing at least one catenary ether oxygen atom; a chiral or achiral hydrocarbon or hydrocarbon ether terminal portion; and a central core connecting the terminal portions) described in U.S. Pat. Nos. 5,474,705 and 5,702,637, as well as in U.S. Ser. No. 08/965348 (filed Nov. 6, 1997) and U.S. Ser. No. 08/998400 (filed Dec. 24, 1997), the descriptions of which are incorporated herein by reference. Preferably, the chiral fluorochemical terminal portion of such compounds can be represented by the formula

—D—R*—D—R$_f'$  (II)

where R* is a cyclic or acyclic chiral moiety; R'$_f$ is fluoroalkyl, perfluoroalkyl, fluoroether, or perfluoroether; and each D is independently selected from the group consisting of a covalent bond, —C (=O)—O—C$_r$H$_{2r}$—, —O—C$_r$H$_{2r}$—, —O—(O=) C—C$_r$H$_{2r}$—, —C≡C—, —CH=CH—, —C(=O)—, —O—(C$_s$H$_{2s}$O—)$_t$C$_r$H$_{2r}$—, —C$_r$H$_{2r}$—, —(C$_s$H$_{2s}$O—)$_t$C$_r$H$_{2r}$—, —O—, —S—, —OSO$_2$—, —SO$_2$—, —SO$_2$—C$_r$H$_{2r}$—,

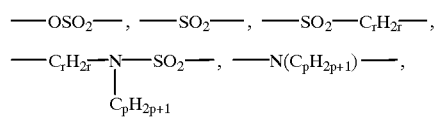

—C$_r$H$_{2r}$—N—SO$_2$—, —N(C$_p$H$_{2p+1}$)—,
            |
            C$_p$H$_{2p+1}$

—C$_r$H$_{2r}$—N—C (=O)—, —CH=N—, and combinations thereof, where one or more hydrogen atoms can optionally be replaced with fluorine, and where r and r' are independently integers of 0 to about 20, s is independently an integer of 1 to about 10 for each (C$_s$H$_{2s}$O), t is an integer of 1 to about 6, and p is an integer of 0 to about 4.

A preferred subclass of such compounds are those having the formula:

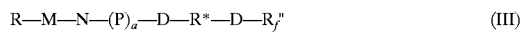

R—M—N—(P)$_a$—D—R*—D—R$_f''$  (III)

where M, N, and P are independently selected from the group consisting of aromatic, heteroaromatic, alicyclic, heteroalicyclic, substituted aromatic, substituted heteroaromatic, substituted alicyclic, and substituted heteroalicyclic rings, the individual rings being fused or non-fused, and the rings being connected with each other by a covalent bond or an organic linking group; R is an alkyl group, an alkenyl group, an alkoxy group, or an alkoxy alkylene group; D and R* are as defined above for Formula II; a is an integer of 0 or 1; and R$_f''$ is a perfluoroether group.

Preferably, M, N, and P are each independently selected from the group consisting of

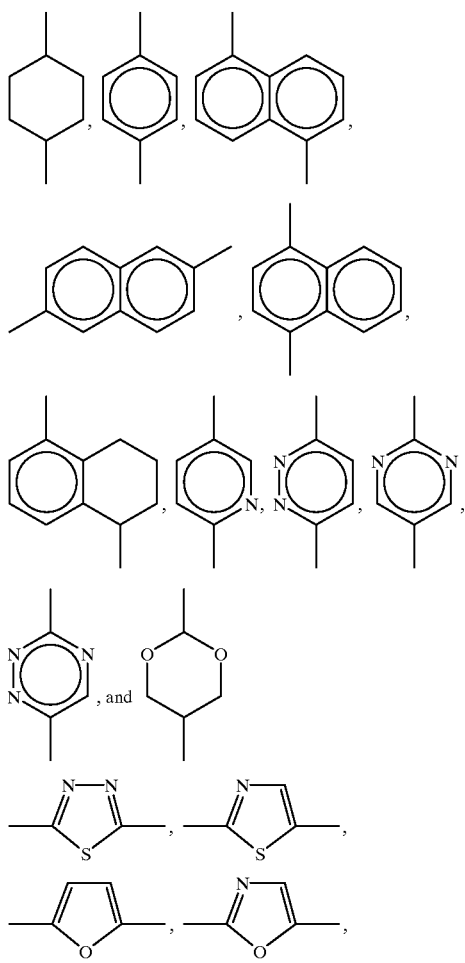

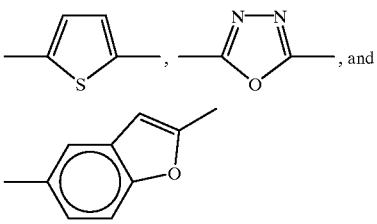

where one or more of the ring hydrogen atoms can be replaced with fluorine atoms; R has from about 4 to about 12 carbon atoms; and $R_f''$ can be represented by the formula $(C_xF_{2x}O)_zC_yF_{2y+1}$, where x is independently an integer of 1 to about 10 for each $(C_xF_{2x}O)$, y is an integer of 1 to about 10, and z is an integer of 1 to about 4 (more preferably, an integer of 2 or 3).

A more preferred subclass of such compounds can be represented by Formula IV:

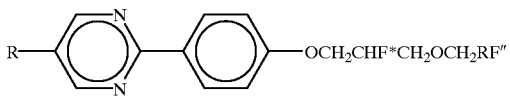

where one or more ring hydrogen atoms can be replaced with fluorine atoms; and where R and $R_f''$ are as defined above for Formula III.

Preferred chiral compounds for use as polarization additives include those represented by the following formulas:

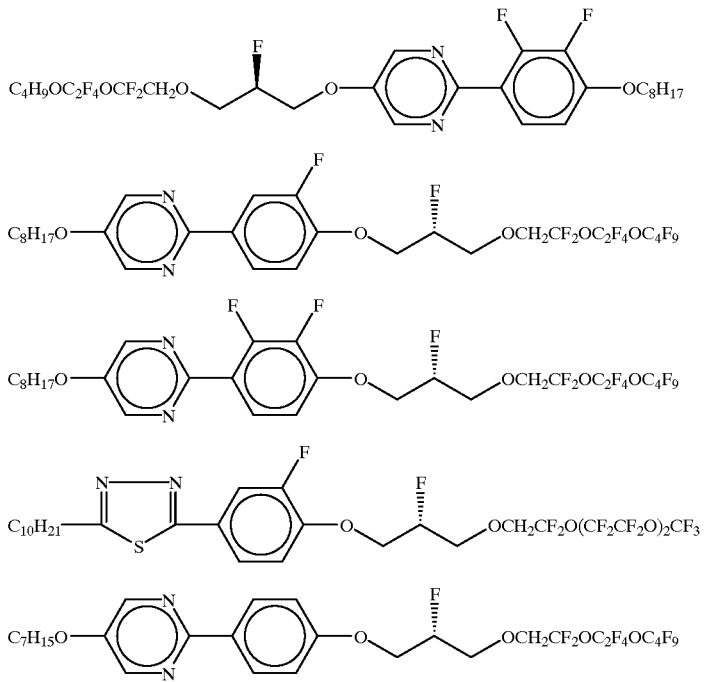

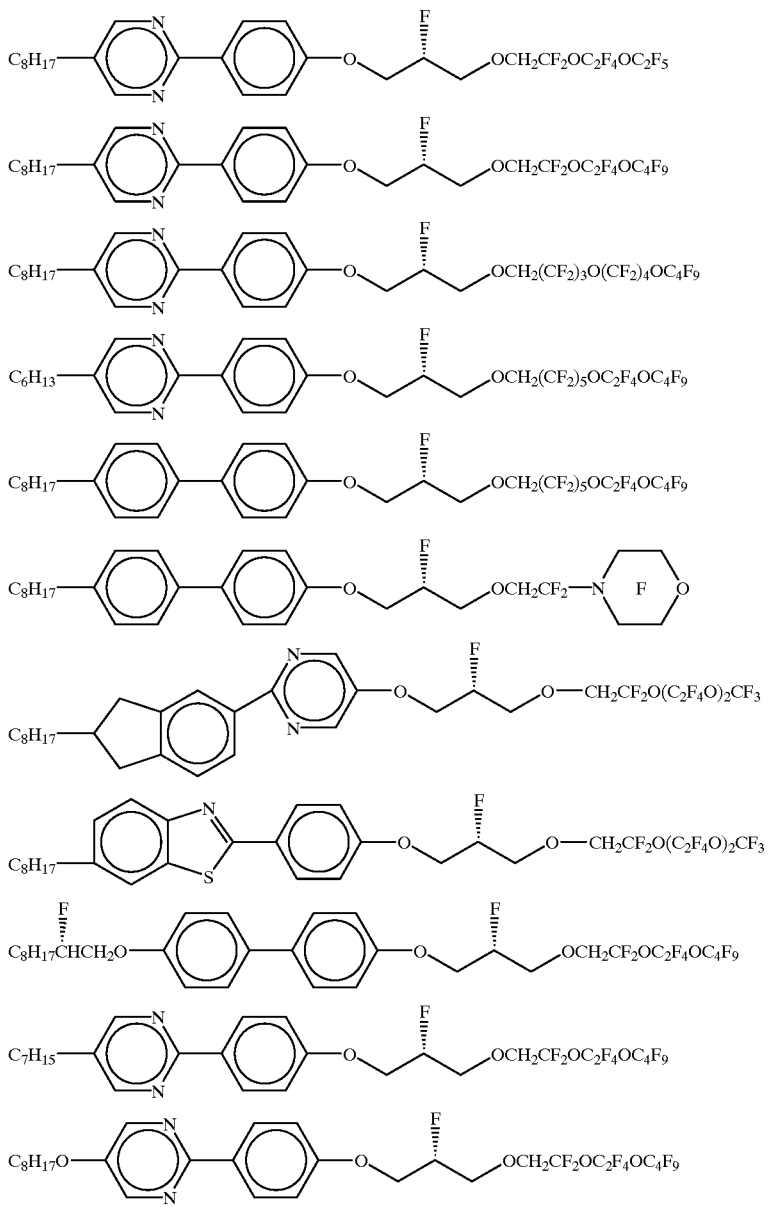

Although only one optical isomer is shown above for each compound, either the R- or the S- isomer can be used in the liquid crystal composition of the device of the invention.

Achiral liquid crystal compounds suitable for use as component (ii) of the liquid crystal composition of the device of the invention are those that can be represented by Formula I above. These achiral liquid crystal compounds exhibit latent tristable switching properties that can be expressed upon the addition of one or more chiral polarization additives. Such compounds and their preparation have been described, e.g., in U.S. Pat. Nos. 5,262,082 (Janulis), 5,437,812 (Janulis), 5,474,705 (Janulis), 5,482,650 (Janulis), and 5,658,491 (Kistner), the descriptions of which are incorporated by reference.

Preferably component (ii) comprises compounds of the formula:

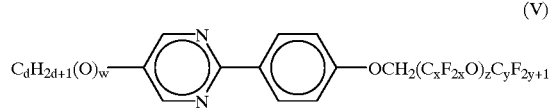

(V)

where d is an integer of about 4 to about 12; w is an integer of 0 or 1; x is independently an integer of 1 to about 10 for each $(C_xF_{2x}O)$; y is an integer of 1 to about 6; and z is an integer of 1 to about 4.

Preferred achiral compounds include:

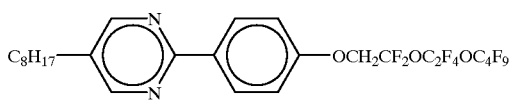

-continued

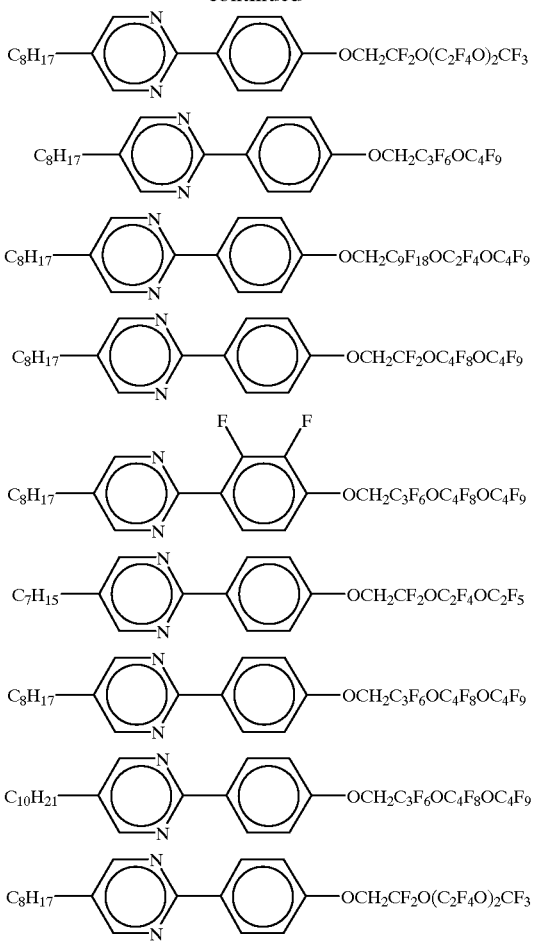

The compounds comprising the liquid crystal composition of the device of the invention can exhibit latent smectic properties. Latent smectic liquid crystal compounds are those which by themselves may not exhibit certain smectic mesophase(s), e.g., tilted smectic mesophase(s), but which, when in admixture with compounds having smectic mesophases or with other compounds having latent smectic mesophases, develop or exhibit smectic mesophases under appropriate conditions.

The device of the invention containing the above-described liquid crystal composition can be driven by either a passive or an active matrix display. A typical liquid crystal display consists, e.g., of two polarizers, two transparent substrates, switching elements or electrodes to define pixels, and driver Integrated Circuits (ICs) to address rows and columns of pixels. The rows and columns can be constructed out of strips of conductive material.

In a passive matrix display, pixel-matrix elements can be defined by the intersection areas of rows and columns of a transparent conductor material, e.g., indium tin oxide (ITO), on the inner surfaces of two opposed substrates. To switch or address a liquid crystal composition disposed between these pixel-matrix elements, charge is applied to the appropriate row and column in order to change the orientation of the liquid crystal material (i.e., to change from a dark pixel to a bright pixel). Passive matrix displays have been described, for example, by Peter J. Collings in *Liquid Crystals: Nature's Delicate Phase of Matter*, pp. 100–103, Princeton University Press, Princeton, N.J. (1990) and by Peter J. Collings and Michael Hird in *Introduction to Liquid Crystals Chemistry and Physics*, pp. 271–285, Taylor and Francis Ltd., London (1997).

In order to improve on the limitations of passive matrix displays (such as crosstalk caused by driving waveforms), an active matrix display was developed. Active matrix displays typically have thin film transistors (TFTs) or diode arrays on a glass substrate, which indirectly address each pixel element. The TFT can comprise amorphous silicon (a-Si) or polycrystalline silicon (p-Si) or can comprise a single crystal semiconductor device such as a CYLOS (Complementary Metal Oxide Semiconductor) silicon-based device. The TFT electrically isolates one pixel element from the others in the display and eliminates the problem of partially active pixels. TFT can simply be considered a switch; when selected (on), it allows charge to flow through it, and, when off, it acts as a barrier that prevents or at least restricts the flow of charge. When a row of TFTs is addressed, gate lines are active, and the "switch" is turned on, allowing charge to flow from the columns into the pixels and to set the image for the frame cycle. Once a row has been addressed, the gate line is reverse biased (the switch is turned off) to insure that no charge can pass from the columns into the pixel elements. Thus, the pixel is now isolated as the rest of the display is addressed. Active matrix arrays have been described, for example, by Collings supra and in U.S. Pat. No. 5,631,752 (Tonaka), the descriptions of which are incorporated herein by reference.

The above-described liquid crystal compositions used in the device of the invention exhibit excellent threshold voltage characteristics. Threshold voltage is the voltage that must be applied to a device to achieve a certain percent transmission as the voltage is gradually increased or decreased so as to effect a significant change in the transmission of the device, e.g., a change from a dark (close to zero transmission) state to a bright (high percent transmission) state, or vice versa. A liquid crystal composition can be evaluated using the threshold voltage values $V_{10}$ (+) and $V_{90}$ (+), which are the voltages required to achieve 10% and 90% transmission levels, respectively, when increasing the voltage to give a transmission change from dark to bright. The threshold voltage values $V'_{10}$ (+) and $V'_{90}$ (+) are the voltages required to achieve 10% and 90% transmission levels when decreasing the voltage to give a transmission change from bright to dark.

Figure 2:
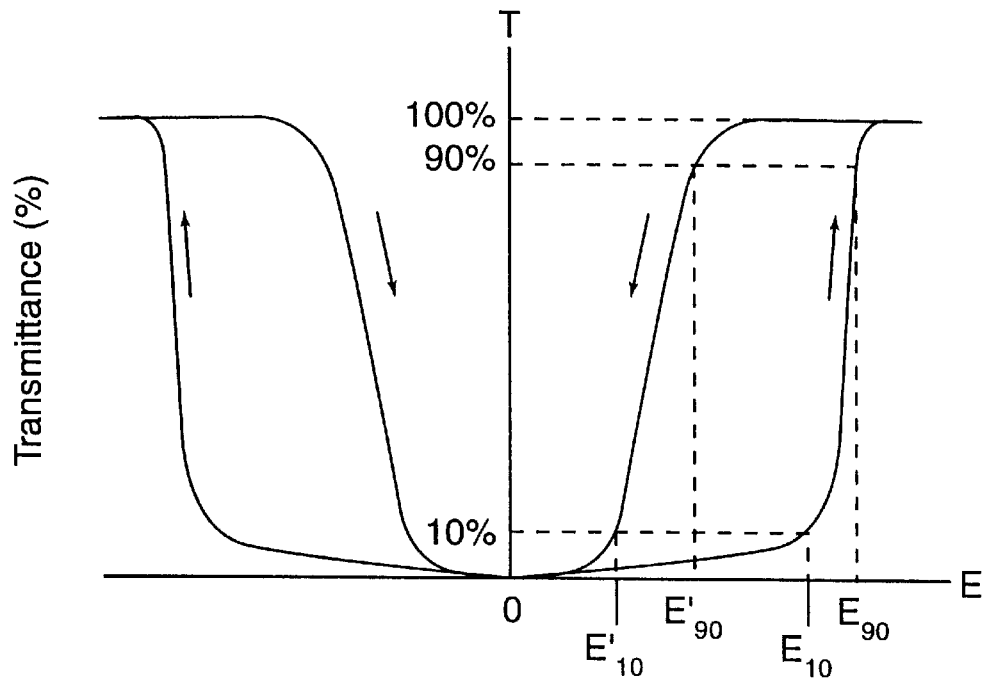
FIG. 2 shows the electro-optical response (double hysteresis) of an embodiment of the liquid crystal device of the invention having a positive value for memory margin.
Figure 3:
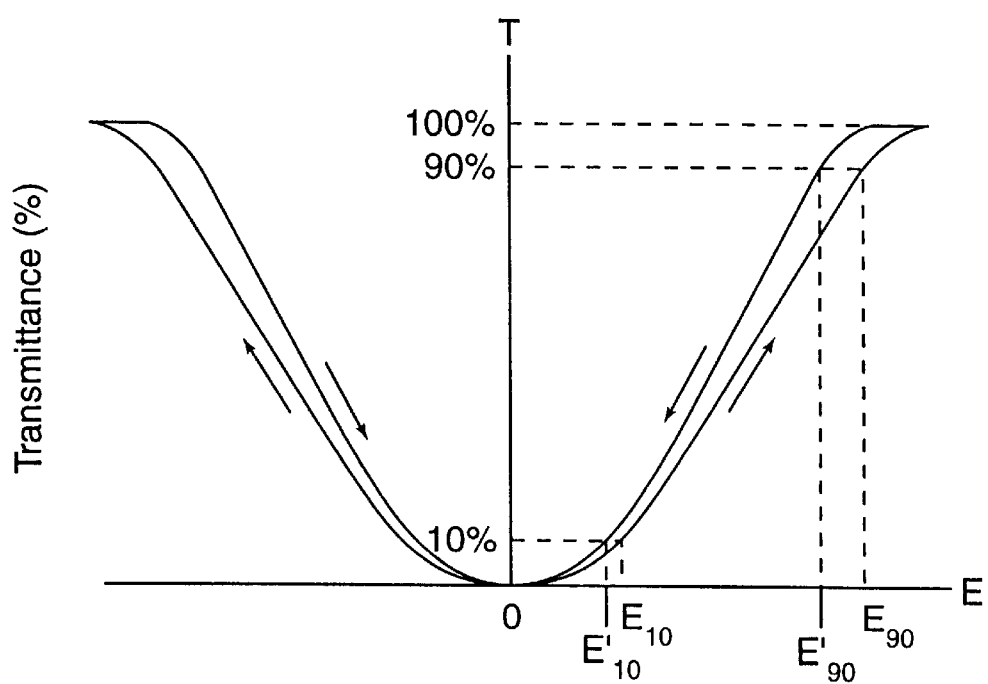
FIG. 3 shows the electro-optical response (double hysteresis) of an embodiment of the liquid crystal device of the invention having a negative value for memory margin.

As shown in FIGS. 2 and 3, it is often more convenient to evaluate a liquid crystal composition as a function of electric field, E, rather than as a function of voltage, in order to obtain a more device-independent evaluation of a composition's switching properties. Thus, values for $E_{10}(+)$, $E_{90}(+)$, $E'_{10}(+)$, and $E'_{90}(+)$ can be obtained, which relate to the $V_{10}(+)$, etc., values in the following manner:

$V_{10}(+)$ (volts)/cell thickness (microns)=$E_{10}(+)$ (volts/micron)

Preferably, the liquid crystal composition used in the device of the invention exhibits a threshold $E_{10}$ value of less than 10 V/$\mu$, more preferably less than 5 V/$\mu$, and most preferably less than 1 V/$\mu$.

Hysteresis is a characteristic that can be exhibited by a liquid crystal composition, in which the observed transmission or transmittance of the composition assumes a different value depending on whether the applied voltage or electric field is increasing or decreasing. If the voltage or electric field is cycled over an appropriate range, a plot of the transmittance forms a closed loop. The electric field hysteresis value $E_{hyst\,90}$ (+) is this electric field difference between the $E_{90}$ (+) and $E'_{90}$ (+) values.

Many of the liquid crystal compositions used in the device of the invention exhibit hysteresis. The hysteresis exhibited by the compositions is especially well-suited for tristable switching displays. For compositions having relatively high hysteresis (e.g., as in FIG. 2), the transmittance of a device containing the composition can vary greatly with a small change in voltage (especially with temperature variations), rendering the composition less suitable for obtaining grey scale.

The memory margin (M) of a liquid crystal composition is determined by its hysteresis and its threshold characteristics. Generally the larger the hysteresis and the steeper the threshold characteristics, the higher the memory margin. The memory margin corresponds to the bistability that a liquid crystal device with large hysteresis exhibits. Memory margin can be calculated as follows:

$$M=(E_{10}-E'_{90})/(E_{90}-E_{10})$$

where $E_{10}$ is the electric field at which the liquid crystal composition exhibits a transmittance of 10% as the electric field is increased from 0 volts/$\mu$, $E_{90}$ is the electric field at which the liquid crystal composition exhibits a transmittance of 90% as the electric field is increased from 0 volts/$\mu$, and $E'_{90}$ is the electric field at which the liquid crystal composition exhibits a transmittance of 90% as the electric field is decreased from its value at 100% transmittance. The transmittance is 0% when the electric field is 0 volts/$\mu$ and 100% when the electric field is at a maximum.

When a liquid crystal composition exhibits a small hysteresis, a relatively flat voltage/transmittance slope, and a low threshold voltage, its memory margin approaches –1, as is shown in FIG. 3. When the composition exhibits no hysteresis, its memory margin is –1. Liquid crystal compositions having a negative value for memory margin are especially useful for active matrix/grey scale devices. When a composition exhibits a relatively sharp slope for the electric field/transmittance curve and/or when its hysteresis is large, then its memory margin has a positive value, as shown in FIG. 2. Liquid crystal compositions having a positive value of memory margin are especially useful for passive matrix tristable devices.

Of particular interest is "V-shaped" tristable switching in liquid crystal devices. This refers to a threshold less, hysteresis-free switching described, e.g., by S. Inui et al. in J. Mater. Chem. 6(4), 671–673 (1996) and suggested for use in active matrix or thin-film transistor devices. Many of the compositions used in the device of the invention exhibit very low threshold and low hysteresis switching and approach the ideal "V-shaped" switching described by Inui.

In the passive addressing of liquid crystal compositions exhibiting a spontaneous polarization, however, low polarization mixtures can be important for the practical operation of a liquid crystal device. Polarization reversal fields are larger for higher polarization mixtures, and polarization reversal fields can cause switching or partial switching back to a composition's original director alignment. This can result in loss of the twistability that: is crucial to the passive-matrix driving of tristable liquid crystal devices.

Another potential disadvantage of using high polarization mixtures is the partial switching of their director alignment in response to non-switching (secondary) signals in a driving waveform. This continued response or fluctuation of the director can cause a large decrease in the contrast ratio of a tristable liquid crystal device.

The spontaneous polarization values, $P_s$, of a tilted smectic or induced tilted smectic mesophase of the liquid crystal compositions used in the device of the invention can preferably be in the range of less than about 100 nC/cm$^2$ at the operating temperature range of the device. Higher spontaneous polarization values require higher applied fields to switch the device. In a passive matrix device, for example, the necessary higher fields can increase crosstalk and thereby reduce resolution. In an active matrix device, the thin film transistors (TFTs) can only handle a limited amount of charge per unit time, so operation with a higher electric field can damage the transistors. TFTs that can operate under the higher fields would significantly add to the cost of the device.

The polarization of the liquid crystal composition can be controlled by admixing one or more chiral liquid crystal compounds (polarization additives, which can have polarization values in the range of as high as about 150 to about 250 nC/cm$^2$ at the operating temperature range of the device) with one or more of the above-described achiral liquid crystal compounds to appropriately adjust the polarization of the composition. For use in a tristable liquid crystal device, the polarization of the composition is preferably less than about 100 nC/cm$^2$, more preferably less than about 75 nC/cm$^2$, and most preferably less than about 50 nC/cm$^2$ at the operating temperature range of the device, which is preferably about 30° C.

The ratio of component (i) to component (ii) to be used in preparing the liquid crystal composition of the device of the invention will depend on the desired operating characteristics of the liquid crystal device, e.g., net polarization, operating temperature range, threshold properties, response time, till angle, and contrast. The liquid crystal composition can generally contain from about 5 to about 50 weight % or even higher of the polarization additive component (component (i)) and from about 95 to about 50 weight % or less of the achiral component (component (ii)). Preferred ranges will reflect the desired operating characteristics of the device.

One of the most important characteristics of a liquid crystal display device is its response time, i.e., the time required for the device to switch from the off (dark) state to the on (light) state and back to the off (dark) state. In a ferroelectric or anti-ferroelectric device, response time ($\tau=\eta\sin^2\Theta/P_sE$) is proportional to the rotational viscosity ($\eta$) of the liquid crystal composition contained within the device, is also proportional to the square of the sine of the cone tilt angle ($\Theta$) of a tilted or induced tilted smectic mesophase of the composition, and is inversely proportional to the polarization ($P_s$) of the composition and to the applied electric field (E). Thus, with compositions having desirably low polarizations, fast response times can be obtained by using compositions having low viscosities.

When the liquid crystal composition of a device is oriented such that a zero field optical axis (layer normal) is parallel to the polarizations axis of one of the crossed polarizers of the device, the transmission of the device follows the general transmission equation shown below, and tristable switching results under application of electric field:

$$I=I_O (\sin^2 (2\Theta)) (\sin^2 (\pi\Delta nd/\lambda)),$$

where $I_O$=transmission through parallel polarizers, $\Theta$=cone tilt angle of the liquid crystal composition, $\Delta n$=birefringence of the liquid crystal composition, d=device spacing (the cell gap), and $\lambda$=wavelength of light used. The maximum transmission is obtained when both the terms $\sin^2 (2\Theta)$ and $\sin^2 (\pi\Delta nd/\lambda)$ are at a maximum (each term equals one). Since the first term is at a maximum when the liquid crystal composition in the device has a cone tilt angle of 45 degrees, liquid crystal compounds which have cone tilt angles close to 45 degrees (or which can be mixed with other liquid crystal compounds to form compositions having cone tilt angles close to 45 degrees) are highly desired in the art.

The fluorinated chiral tilted smectic compounds used in the liquid crystal composition of the device of the invention have a number of desirable properties when used in admixture with other liquid crystal compounds, preferably compounds having fluorinated terminal portions such as those compounds described, for example, in U.S. Pat. Nos. 4,886,619 (Janulis), 5,082,587 (Janulis), and 5,262,082 (Janulis et al.), the descriptions of which are incorporated herein by reference. For example, the compounds of the device of the invention when admixed with such preferred liquid crystal compounds show excellent compatibility, show a beneficial effect or only a minimal negative effect on the tilted smectic or induced tilted smectic temperature range of the resulting mixtures (even when present at high concentrations), enable control of layer spacing, and provide tristable switchable mixtures having fast electrical response times, low polarizations, and low viscosities when used in the device of the invention.

The tilted smectic or induced tilted smectic mesophase of a liquid crystal composition comprises layers of liquid crystal molecules that are tilted in the absence of an electric field. The sinectic A mesophase is normally not tilted, but for some of the liquid crystal compounds used in the device of the invention, a tilt can be induced by the application of an electric field, and tristable switching can be observed. Devices that exhibit tristable switching in a smectic A mesophase generally have electric field/transmittance curves characterized by little or no hysteresis and no sharp transitions.

Objects and advantages of this invention are further illustrated by the following examples, but the particular materials and amounts thereof recited in these examples, as well as other conditions and details, should not be construed to unduly limit this invention.

In the following examples, any temperatures are in degrees Celsius and any parts and percentages are by weight unless indicated otherwise. Commercially available materials were chemically transformed by reaction pathways well-known to those skilled in the art. Chemical transformations were comprised of acylation, esterification, etherification, alkylation, and combinations thereof using fluorine-containing and non-fluorine-containing reactants to provide the precursor compounds, which, in turn, were caused to react together to yield the liquid crystal compounds used in the device of the invention.

Compounds prepared for use in the device of the invention were characterized by their melting or boiling point, and structures were confirmed by using at least one of the following methods of analysis: chromatography; $^{13}$C-, $^1$H-, and $^{19}$F-NMR; and infrared and mass spectroscopies.

EXAMPLES

Examples 1 Through 20 and Comparative Examples A and B

Liquid crystal display devices were prepared and evaluated in the following manner:

To a glass plate provided with an ITO film having a prescribed pattern, a 0.5 weight % solution of nylon-6,6 in formic acid was applied by spin coating, followed by drying and subjecting the resultant nylon film to an orientation treatment by rubbing to form a 400 angstrom thick alignment control layer. To another glass plate provided with an ITO film having a prescribed pattern, a solution of a polysiloxane such as Techniglas™ GR651L was applied by spin coating, followed by hot curing to form a 200 angstrom thick alignment control layer. Two spacers (average size 2 $\mu$) were placed onto one of the glass plates, and the plates were brought together to provide a blank cell having a cell gap of 2.3$\mu$.

A number of blank cells were prepared in the above manner and were filled with the liquid crystal compositions shown in Table 1 at about 5 degrees centigrade above the clearing point (the isotropic to smectic phase temperature) of the composition, under a nitrogen atmosphere. The liquid crystal composition was placed at the opening of the cells, and the cells were placed in an oven at room temperature. The oven was evacuated by vacuum pump and backfilled with nitrogen several times. The oven temperature was ramped to 5 degrees above the clearing point under a nitrogen atmosphere. The cells were left. at this temperature for about 15 to 30 minutes, a time sufficient for a cell to fill by capillary action, then allowed to naturally cool to room temperature in the oven over about 3 to 4 hours, depending on the clearing point temperature. Any excess liquid crystal composition was wiped from each cell using cotton swabs, and the openings of the cells were sealed using a commercially available 5 minute epoxy. Silver coated wire leads were attached to the ITO contact pads of the cells using an indium:tin solder.

Each cell was placed in a hot stage with openings to allow transmitted light. The hot stage and the cell were placed between the crossed polarizers of a transmitting, polarizing microscope. The microscope was equipped with a Hamamatsu Model HC 124-01 photomultiplier tube (PMT) and amplifier to detect the transmitted light levels. The PMT amplifier output was connected to a Tektronix Model TDS 420 oscilloscope. A triangle waveform test signal was generated by a Wavetek Model 395 arbitrary function generator. The signal from the generator was amplified through a Krone-Hite Model 7602 wideband amplifier. The oscilloscope was set to plot the transmission signal versus the triangle waveform test signal. The cell was heated to about 10 degrees above the isotropic transition of the liquid crystal composition and was cooled back down at 0.5 degrees per minute to the smectic A phase, without any signal being applied to the cell.

The microscope stage was rotated to align a zero field optical axis (smectic layer normal) of the liquid crystal composition with one of the crossed polarizers. The cell was cooled to a few degrees above a tilted smectic phase of the liquid crystal composition. To enable the tilted phase to to be detected, the triangle signal was applied to the cell. A phase change (at $T_c$) from the smectic A mesophase to the tilted smectic mesophase was detected by a change in transmission signal to a non-linear response. In a smectic A mesophase, any transmission signal from the PMT is due to an electroclinic effect which gives a domainless, linear transmission response. In a tilted smectic or induced tilted smectic mesophase, the transmission response becomes non-linear. Transmission versus voltage curves were generated at the selected frequencies and selected temperatures indicated in Table 2 below.

Alternatively, some of the transmission/voltage plots were determined using a DC-sweep. Using the above-described equipment, the oscilloscope was set to plot voltage versus time and transmission versus time, instead of transmission versus voltage. Data was taken as follows: the DC voltage level was adjusted to a desired voltage, and the transmission value was measured after a 10 second to 1 minute delay, to allow for the liquid crystal switching to settle. The DC voltage was adjusted to the next voltage level, and the transmission level was again recorded after allowing the switching to settle. This process was repeated in a sweep starting from zero voltage to a positive voltage sufficient to reach maximum transmission, then back through zero volts to a negative voltage sufficient to reach maximum transmission, then the DC voltage was swept back to zero volts. Test measurements using this alternative procedure are noted in Table 2 as "DC sweep" under the column header "Frequency".

The liquid crystal compositions were evaluated for transition temperatures by optical observation of material phase changes using a Linkham THM600 hot stage and a Zeiss polarizing microscope. Transition temperatures (° C.) were obtained upon cooling through the isotropic state (I) to the smectic A mesophase ($S_A$) and the smectic C mesophase ($S_C$), and are set forth in Table 3.

The polarizations of the liquid crystal compositions were determined essentially as described by Miyasato et al. in Jap. Appl. Phys. 22, 661 (1983). The electronic response, $\tau_{electric}$, was derived from the displacement current of the liquid crystal device under an applied square voltage pulse. The current was then viewed on a 100 MHz bandwidth oscilloscope. The usual decaying exponential, associated with a dielectric filled capacitor, was followed by the spontaneous polarization ($P_s$) switching pulse. The time from the rising edge of the voltage pulse to the peak of the $P_s$ pulse was taken to be $\tau_{electric}$. The rotational viscosity (smectic viscosity, $\eta$) was calculated as shown below:

$$\eta(10^{-3} kg/m \cdot s) = 0.01 \cdot P_s \cdot E \cdot \tau_{electric}$$

where the units of $P_s$, E, and $\tau_{electric}$ are respectively $nC/cm^2$, $V/\mu$, and $\mu s$. The tilt angle $\phi$ of the mixture was taken to be half the angle separating the extinction points of the driven states. The results of these measurements are shown in Table 3.

TABLE 1

| Example No. | Weight Components | % | Preparation |
|---|---|---|---|
| 1 | C$_8$H$_{17}$—[pyrimidine]—[phenyl]—OCH$_2$CF$_2$OC$_2$F$_4$OC$_4$F$_9$ | 25 | U.S. Pat. No. 5262082 Ex. 16 |
|  | C$_8$H$_{17}$—[pyrimidine]—[phenyl]—OCH$_2$C$_3$F$_6$OC$_4$F$_9$ | 8.8 | U.S. Pat. No. 5482650 Ex. 65 |
|  | C$_8$H$_{17}$—[pyrimidine]—[phenyl]—OCH$_2$CF$_2$O(C$_2$F$_4$O)$_2$CF$_3$ | 16.2 | U.S. Pat. No. 5482650 Ex. 61 |
|  | C$_8$H$_{17}$—[pyrimidine]—[phenyl]—O—CH(F)—OCH$_2$CF$_2$OC$_2$F$_4$OC$_4$F$_9$ | 50 | U.S. Pat. No. 5702637 Ex. 5 |
| 2 | C$_8$H$_{17}$—[pyrimidine]—[phenyl]—OCH$_2$CF$_2$OC$_4$F$_8$OC$_4$F$_9$ | 25 | U.S. Pat. No. 5262082 Ex. 16 |
|  | C$_8$H$_{17}$—[pyrimidine]—[phenyl]—OCH$_2$C$_9$F$_{18}$OC$_2$F$_4$OC$_4$F$_9$ | 25 | U.S. Pat. No. 5482650 Ex. 111 |
|  | C$_8$H$_{17}$—[pyrimidine]—[phenyl]—O—CH(F)—OCH$_2$CF$_2$OC$_2$F$_4$OC$_4$F$_9$ | 50 | U.S. Pat. No. 5702637 Ex. 5 |
| 3 | C$_8$H$_{17}$—[pyrimidine]—[phenyl]—OCH$_2$CF$_2$OC$_2$F$_4$OC$_4$F$_9$ | 25 | U.S. Pat. No. 5262082 Ex. 16 |

TABLE 1-continued

| Example No. | Weight Components | % | Preparation |
|---|---|---|---|
| | 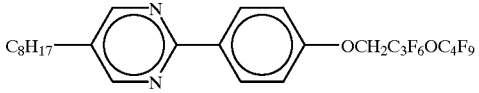 C$_8$H$_{17}$— [pyrimidine]—[phenyl]—OCH$_2$C$_3$F$_6$OC$_4$F$_9$ | 8.8 | U.S. Pat. No. 5482650 Ex. 65 |
| |  C$_8$H$_{17}$— [pyrimidine]—[phenyl]—OCH$_2$CF$_2$O(C$_2$F$_4$O)$_2$CF$_3$ | 16.2 | U.S. Pat. No. 5482650 Ex. 61 |
| | 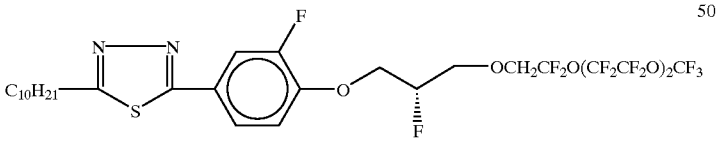 C$_{10}$H$_{21}$— [thiadiazole]—[F-phenyl]—O—CH$_2$—(CF)—OCH$_2$CF$_2$O(CF$_2$CF$_2$O)$_2$CF$_3$ | 50 | U.S. Ser. No. 08/965348 Ex. 67 |
| 4 |  C$_8$H$_{17}$— [pyrimidine]—[phenyl]—OCH$_2$CF$_2$OC$_4$F$_8$OC$_4$F$_9$ | 25 | U.S. Pat. No. 5262082 Ex. 16 |
| |  C$_8$H$_{17}$— [pyrimidine]—[phenyl]—OCH$_2$C$_9$F$_{18}$OC$_2$F$_4$OC$_4$F$_9$ | 25 | U.S. Pat. No. 5482650 Ex. 111 |
| | 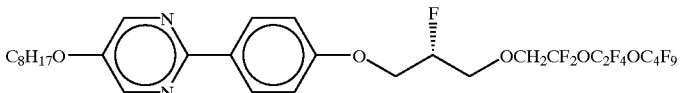 C$_8$H$_{17}$O— [pyrimidine]—[phenyl]—O—CH$_2$—(CF)—OCH$_2$CF$_2$OC$_2$F$_4$OC$_4$F$_9$ | 50 | U.S. Pat. No. 5702637 Ex. 10 |
| 5 | 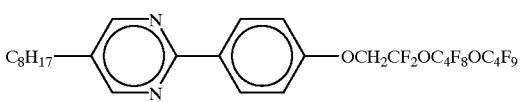 C$_8$H$_{17}$— [pyrimidine]—[phenyl]—OCH$_2$CF$_2$OC$_4$F$_8$OC$_4$F$_9$ | 37.5 | U.S. Pat. No. 5262082 Ex. 16 |
| |  C$_8$H$_{17}$— [pyrimidine]—[phenyl]—OCH$_2$C$_9$F$_{18}$OC$_2$F$_4$OC$_4$F$_9$ | 37.5 | U.S. Pat. No. 5482650 Ex. 111 |
| | 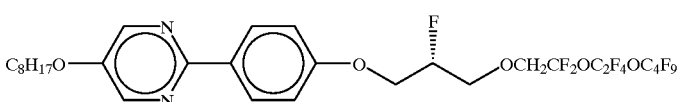 C$_8$H$_{17}$O— [pyrimidine]—[phenyl]—O—CH$_2$—(CF)—OCH$_2$CF$_2$OC$_2$F$_4$OC$_4$F$_9$ | 25 | U.S. Pat. No. 5702637 Ex. 10 |
| 6 | 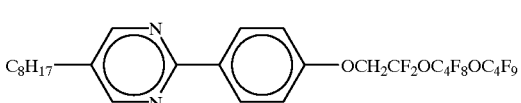 C$_8$H$_{17}$— [pyrimidine]—[phenyl]—OCH$_2$CF$_2$OC$_4$F$_8$OC$_4$F$_9$ | 12.5 | U.S. Pat. No. 5262082 Ex. 16 |
| | 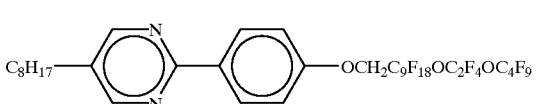 C$_8$H$_{17}$— [pyrimidine]—[phenyl]—OCH$_2$C$_9$F$_{18}$OC$_2$F$_4$OC$_4$F$_9$ | 12.5 | U.S. Pat. No. 5482650 Ex. 111 |
| | 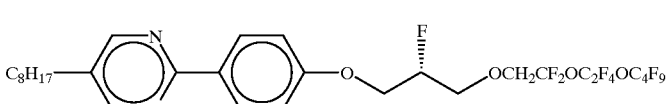 C$_8$H$_{17}$— [pyrimidine]—[phenyl]—O—CH$_2$—(CF)—OCH$_2$CF$_2$OC$_2$F$_4$OC$_4$F$_9$ | 75 | U.S. Pat. No. 5702637 Ex. 5 |

TABLE 1-continued

| Example No. | Weight Components | % | Preparation |
|---|---|---|---|
| 7 | C8H17-[pyrimidine]-[phenyl]-OCH2CF2OC4F8OC4F9 | 37.5 | U.S. Pat. No. 5262082 Ex. 16 |
| | C8H17-[pyrimidine]-[phenyl]-OCH2C9F18OC2F4OC4F9 | 37.5 | U.S. Pat. No. 5482650 Ex. 111 |
| | C8H17-[pyrimidine]-[phenyl]-O-CH2CH(F)CH2-OCH2CF2OC2F4OC4F9 | 25 | U.S. Pat. No. 5702637 Ex. 5 |
| 8 | C8H17-[pyrimidine]-[phenyl]-OCH2CF2OC4F8OC4F9 | 25 | U.S. Pat. No. 5262082 Ex. 16 |
| | C8H17-[pyrimidine]-[phenyl]-OCH2C9F18OC2F4OC4F9 | 25 | U.S. Pat. No. 5482650 Ex. 111 |
| | C8H17-[pyrimidine]-[phenyl]-O-CH2CH(F)CH2-OCH2C9F18OC2F4OC4F9 | 50 | U.S. Pat. No. 5702637 Ex. 13 |
| 9 | C7H15-[pyrimidine]-[phenyl]-OCH2CF2OC2F4OC2F5 | 75 | U.S. Pat. No. 5482650 Ex. 36 |
| | C8H17O-[pyrimidine]-[phenyl]-O-CH2CH(F)CH2-OCH2CF2OC2F4OC4F9 | 25 | U.S. Pat. No. 5702637 Ex. 10 |
| 10 | C8H17-[pyrimidine]-[phenyl]-OCH2C3F6OC4F8OC4F9 | 75 | U.S. Pat. No. 5482650 Ex. 59 |
| | C8H17O-[pyrimidine]-[phenyl]-O-CH2CH(F)CH2-OCH2CF2OC2F4OC4F9 | 25 | U.S. Pat. No. 5702637 Ex. 10 |
| 11 | C8H17-[pyrimidine]-[phenyl]-OCH2CF2OC4F8OC4F9 | 75 | U.S. Pat. No. 5262082 Ex. 16 |
| | C8H17O-[pyrimidine]-[phenyl]-O-CH2CH(F)CH2-OCH2CF2OC2F4OC4F9 | 25 | U.S. Pat. No. 5702637 Ex. 10 |

TABLE 1-continued

| Example No. | Components | % | Preparation |
|---|---|---|---|
| 12 | C$_{10}$H$_{21}$-[pyrimidine]-[phenyl]-OCH$_2$C$_3$F$_6$OC$_4$F$_8$OC$_4$F$_9$ | 75 | U.S. Pat. No. 5482650 Ex. 60 |
|  | C$_8$H$_{17}$O-[pyrimidine]-[phenyl]-O-CH$_2$CHF-CH$_2$-OCH$_2$CF$_2$OC$_2$F$_4$OC$_4$F$_9$ | 25 | U.S. Pat. No. 5702637 Ex. 10 |
| 13 | C$_8$H$_{17}$-[pyrimidine]-[phenyl]-OCH$_2$CF$_2$OC$_2$F$_4$OC$_4$F$_9$ | 75 | U.S. Pat. No. 5262082 Ex. 16 |
|  | C$_8$H$_{17}$O-[pyrimidine]-[phenyl]-O-CH$_2$CHF-CH$_2$-OCH$_2$CF$_2$OC$_2$F$_4$OC$_4$F$_9$ | 25 | U.S. Pat. No. 5702637 Ex. 10 |
| 14 | C$_8$H$_{17}$-[pyrimidine]-[phenyl]-OCH$_2$CF$_2$O(C$_2$F$_4$O)$_2$CF$_3$ | 75 | U.S. Pat. No. 5482650 Ex. 61 |
|  | C$_8$H$_{17}$O-[pyrimidine]-[phenyl]-O-CH$_2$CHF-CH$_2$-OCH$_2$CF$_2$OC$_2$F$_4$OC$_4$F$_9$ | 25 | U.S. Pat. No. 5702637 Ex. 10 |
| 15 | C$_8$H$_{17}$-[pyrimidine]-[phenyl]-OCH$_2$CF$_2$OC$_4$F$_8$OC$_4$F$_9$ | 37.5 | U.S. Pat. No. 5262082 Ex. 16 |
|  | C$_8$H$_{17}$-[pyrimidine]-[phenyl]-OCH$_2$C$_9$F$_{18}$OC$_2$F$_4$OC$_4$F$_9$ | 37.5 | U.S. Pat. No. 5482650 Ex. 111 |
|  | C$_8$H$_{17}$-[pyrimidine]-[phenyl]-O-CH$_2$CHF-CH$_2$-OCH$_2$CF$_2$OC$_2$F$_4$OC$_4$F$_9$ | 25 | U.S. Pat. No. 5702637 Ex. 5 |
| 16 | C$_8$H$_{17}$-[pyrimidine]-[phenyl]-OCH$_2$CF$_2$OC$_4$F$_8$OC$_4$F$_9$ | 95 | U.S. Pat. No. 5262082 Ex. 16 |
|  | C$_8$H$_{17}$-[pyrimidine]-[phenyl]-O-C(O)-CHCl-CH$_2$-CH(CH$_3$)$_2$ <br> C$_{10}$H$_{21}$-[pyrimidine]-[phenyl]-O-C(O)-CHCl-CH$_2$-CH(CH$_3$)$_2$ | 5 (mixture of 2 compounds) | U.S. Pat. No. 5474705 |

TABLE 1-continued

| Example No. | Weight Components | % | Preparation |
|---|---|---|---|
| 17 | 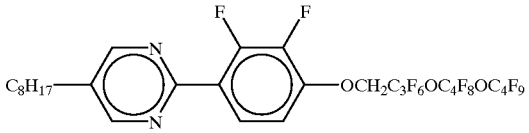 $C_8H_{17}$—[pyrimidine]—[difluorophenyl]—$OCH_2C_3F_6OC_4F_8OC_4F_9$ | 75 | U.S. Pat. No. 5482650 Ex. 59 |
| | 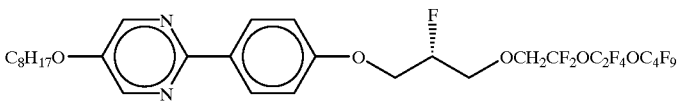 $C_8H_{17}O$—[pyrimidine]—[phenyl]—O—CH$_2$—CHF—$OCH_2CF_2OC_2F_4OC_4F_9$ | 25 | U.S. Pat. No. 5702637 Ex. 5 |
| 18 |  $C_8H_{17}$—[pyrimidine]—[phenyl]—$OCH_2CF_2OC_4F_8OC_4F_9$ | 37.5 | U.S. Pat. No. 5262082 Ex. 16 |
| | 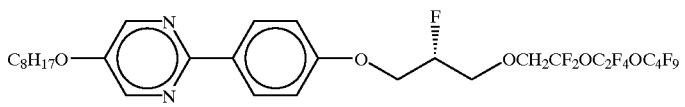 $C_8H_{17}O$—[pyrimidine]—[phenyl]—O—CHF—$OCH_2CF_2OC_2F_4OC_4F_9$ | 37.5 | U.S. Pat. No. 5482650 Ex. 111 |
| | 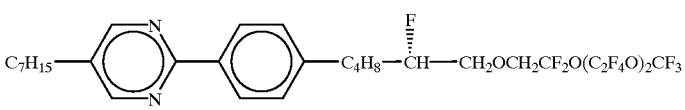 $C_7H_{15}$—[pyrimidine]—[phenyl]—$C_4H_8$—CHF—$CH_2OCH_2CF_2O(C_2F_4O)_2CF_3$ | 25 | U.S. Ser. No. 08/998400 Ex. 67 |
| 19 |  $C_8H_{17}$—[pyrimidine]—[phenyl]—$OCH_2CF_2OC_4F_8OC_4F_9$ | 45 | U.S. Pat. No. 5262082 Ex. 16 |
| | 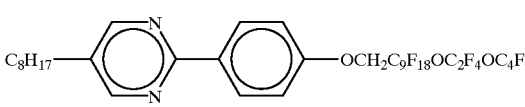 $C_8H_{17}$—[pyrimidine]—[phenyl]—$OCH_2C_9F_{18}OC_2F_4OC_4F_9$ | 45 | U.S. Pat. No. 5482650 Ex. 111 |
| | 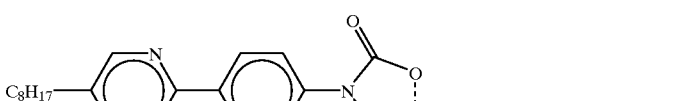 $C_8H_{17}$—[pyrimidine]—[phenyl]—[oxazolidinone]—$OCH_2CF_2OC_2F_4OC_4F_9$ | 10 | U.S. Pat. No. 5702637 Ex. 33 |
| 20 | 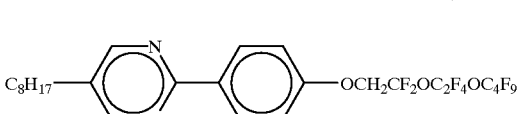 $C_8H_{17}$—[pyrimidine]—[phenyl]—$OCH_2CF_2OC_2F_4OC_4F_9$ | 6.3 | U.S. Pat. No. 5262082 Ex. 16 |
| | 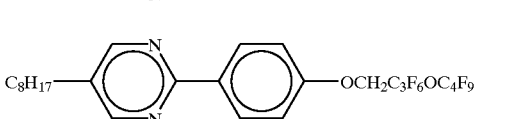 $C_8H_{17}$—[pyrimidine]—[phenyl]—$OCH_2C_3F_6OC_4F_9$ | 2.2 | U.S. Pat. No. 5482650 Ex. 66 |
| |  $C_8H_{17}$—[pyrimidine]—[phenyl]—$OCH_2CF_2O(C_2F_4O)_2CF_3$ | 4.0 | U.S. Pat. No. 5482650 Ex. 61 |
| |  $C_8H_{17}$—[pyrimidine]—[phenyl]—O—CH$_2$—CHF—$OCH_2CF_2OC_2F_4OC_4F_9$ | 12.5 | U.S. Pat. No. 5702637 Ex. 5 |

TABLE 1-continued

| Example No. | Weight Components | % | Preparation |
|---|---|---|---|
| | $C_7H_{15}$—[pyrimidine]—[phenyl]—O—CH$_2$—CHF—CH$_2$—OCH$_2$CF$_2$OC$_2$F$_4$OC$_4$F$_9$ | 75 | U.S. Ser. No. 08/965348 Ex. 81 |
| Comparative A | $C_7H_{15}$—[pyrimidine]—[phenyl]—$C_4H_8$—CHF—CH$_2$—OCH$_2$CF$_2$OC$_2$F$_4$OC$_4$F$_9$ | 80 | U.S. Ser. No. 08/998400 Ex. 157 |
| | $C_8H_{17}$—[pyrimidine]—[phenyl]—O—$C_3H_6$OCH$_2$CF$_2$O(C$_2$F$_4$O)$_2$CF$_3$ | 20 | U.S. Pat. No. 5658491 Ex. 3 |
| Comparative B | $C_8H_{17}$—[pyrimidine]—[phenyl]—$C_6H_{12}$—CHF—CH$_2$—OCH$_2$CF$_2$OC$_2$F$_4$OC$_4$F$_9$ | 100 | U.S. Ser. No. 08/998400 Ex. 144 |

TABLE 2

| Example No. | Temperature (° C.) | $E_{90}$ (V/μ) | $E_{10}$ (V/μ) | Hysteresis, $E_{90}-E_{90}$ (V/μ) | Frequency | Memory Margin |
|---|---|---|---|---|---|---|
| 1a | 48 | 0.55 | 0.40 | 0.33 | DC sweep | 1.2 |
| 1b | 40 | 0.86 | 0.73 | 0.65 | 1 mHz | 4.0 |
| 2 | 48 | 1.22 | 0.9 | 0.46 | DC sweep | 0.44 |
| 3 | 33 | 1.2 | 0.98 | 0.19 | DC sweep | -0.14 |
| 4 | 38 | 1.7 | 0.9 | 1.5 | DC sweep | 0.88 |
| 5a | 74 | 1.0 | 0.65 | 0.39 | DC sweep | 0.11 |
| 5b | 54 | 3.9 | 2.5 | 2.9 | DC sweep | 1.1 |
| 6 | 54 | 0.57 | 0.37 | 0.37 | DC sweep | 0.85 |
| 7a | 63 | 2.28 | 1.76 | 1.81 | DC sweep | 2.5 |
| 7b | 60 | 1.93 | 1.75 | 1.23 | 1 mHz | 5.8 |
| 7c | 40 | 3.73 | 3.07 | 2.19 | 1 mHz | 2.3 |
| 8 | 76 | 0.26 | 0.06 | 0.17 | DC sweep | -0.15 |
| 9 | 54 | 1.33 | 1.09 | 0.98 | DC sweep | 3.1 |
| 10a | 48 | 2.44 | 1.74 | 2.0 | DC sweep | 1.9 |
| 10b | 40 | 2.99 | 2.22 | 1.92 | 1 mHz | 1.9 |
| 11a | 63 | 1.81 | 1.65 | 0.4 | DC sweep | 1.5 |
| 11b | 54 | 3.13 | 2.86 | 1.16 | DC sweep | 3.3 |
| 12 | 28 | 3.52 | 2.86 | 2.31 | DC sweep | 2.5 |
| 13a | 60 | 3.20 | 3.00 | 1.60 | 10 mHz | 7.0 |
| 13b | 50 | 4.3 | 3.6 | 1.80 | 1 mHz | 1.5 |
| 14 | 55 | 0.8 | 0.7 | 0.5 | 1 mHz | 4.0 |
| 15a | 50 | 5.8 | 5.5 | 2.9 | 1 mHz | 8.6 |
| 15b | 30 | 6.4 | 5.1 | 2.6 | 1 mHz | 1.0 |
| 16 | 30.0 | 18.20 | 16.45 | 10.23 | 0.1 Hz | 4.83 |
| 17 | 41.2 | 1.94 | 1.60 | 1.88 | 1.0 Hz | 4.50 |
| 18 | 60.6 | 1.33 | 1.08 | 0.89 | 0.01 Hz | 2.50 |
| 19 | 56.2 | 3.65 | 2.81 | 2.19 | 0.1 Hz | 1.60 |
| 20 | 25.0 | 3.98 | 1.40 | 0.17 | 1.0 Hz | -0.93 |
| Comparative A | | | | bistable | | |
| Comparative B | | | | bistable | | |

In Table 2, the Comparative Examples exhibit bistability, i.e., switching between ferrDelectric states without going through a uniform dark state.

TABLE 3

| Example No. | Transition Temperature for $S_A$ to $S_{C^*}$ (° C.) | Temperature (° C.) | Polarization, $P_s$ (nC/cm$^2$) | Electronic Response, $\tau_{electric}$ (μs) | Tilt Angle (degrees) |
|---|---|---|---|---|---|
| 1 | 54 | 47 | 40.2 | 5.3 | 25.2 |
| | | 20 | 70.5 | 15.5 | 28.5 |
| 2 | 67 | 50 | 61.6 | 8 | 32.1 |
| | | 20 | 90.6 | 24.6 | 30.1 |
| 3 | 38 | 28 | 75.7 | 11.8 | 26.1 |
| | | 24 | 87.6 | 16.9 | 26.8 |
| 4 | 84 | 74 | 49.2 | 6.0 | 32.7 |
| | | 34 | 82.8 | 19 | 36.5 |
| 5 | 78 | 64 | 30.4 | 9.3 | 34.2 |
| | | 53 | 37.0 | 12.7 | 35.4 |
| 6 | 64 | 21 | 130.2 | 15.0 | 31.0 |
| | | 51 | 85.8 | 6.2 | 28.6 |
| 7 | 69 | 60 | 27.3 | 9.2 | 31.6 |
| | | 49 | 35.8 | 12.6 | 33.7 |
| 8 | 83 | 67 | 34.0 | 8.5 | 32.1 |
| | | 49 | 50.0 | 15.2 | 33.7 |
| 9 | 56 | 43 | 25.3 | 7.2 | 24.3 |
| | | 17 | 37.8 | 19.5 | 26.1 |
| 10 | 75 | 54 | 32.0 | 10.8 | 31.9 |
| | | 24 | 45.7 | 33.3 | 33.2 |
| 11 | 65 | 52 | 29.9 | 10.7 | 34.5 |
| | | 22 | 41.0 | 32.9 | 33.9 |
| 12 | 74 | 47 | 33.1 | 18.9 | 36.6 |
| | | 27 | 40.2 | 40.9 | 36.5 |
| 13 | 65 | 55 | 26.1 | 9.5 | 30.3 |
| | | 45 | 31.7 | 13.3 | 33.0 |
| 14 | 59 | 49 | 26.6 | 8.0 | 26.2 |
| | | 19 | 40.8 | 24.4 | 30.9 |
| 15 | 69 | 49 | 35.0 | 10.1 | 30.3 |
| | | 29 | 41.8 | 12.8 | 34.7 |
| 16 | 54.8 | 45.0 | 9.5 | 450 | 19.5 |
| 17 | 51.2 | 41.0 | 36.6 | 11.1 | 26.1 |
| | | 11.0 | 59.1 | 58.7 | 30.9 |
| 18 | 58.6 | 48.1 | 17.3 | 15.0 | 28.0 |
| | | 18.2 | 27.8 | 44.1 | 31.0 |
| 19 | 73.4 | 58.2 | 41.8 | 8.2 | 32.8 |
| | | 24.2 | 64.1 | 36.9 | 36.3 |

TABLE 3-continued

| Example No. | Transition Temperature for $S_A$ to $S_{C^*}$ (° C.) | Temperature (° C.) | Polarization, $P_s$ (nC/cm$^2$) | Electronic Response, $\tau_{electric}$ (μs) | Tilt Angle (degrees) |
|---|---|---|---|---|---|
| 20 | 60.3 | 48.1 | 59.6 | 5.3 | 23.2 |
|  |  | 18.5 | 80.0 | 8.3 | 25.7 |
| Comparative A | 52.8 | 43.7 | 29.3 | 4.5 | 19.3 |
|  |  | 22.9 | 42.9 | 8.7 | 21.4 |
| Comparative B | 59.5 | 50.2 | 25.3 | 5.8 | 22.6 |
|  |  | 19.5 | 42.2 | 9.9 | 24.6 |

The data in Tables 2 and 3 indicates that the devices of the invention, filled with the liquid crystal compositions described in Table 1, generally exhibit threshold $E_{10}$ values of less than about 10 V/m and polarizations ($P_s$) of less than about 100 nC/cm$^2$. Thus, the liquid crystal compositions exhibit characteristics that are advantageous for tristable switching devices. Examples 3, 8, and 20 exhibit values of memory margin between 0 and −1 and are particularly suitable for use in active matrix devices. All other Examples exhibit positive values of memory margin and are particularly suitable for use in passive matrix devices.

Various modifications and alterations of this invention will become apparent to those skilled in the art without departing from the scope and spirit of this invention.

What is claimed is:

1. A tristable liquid crystal display device comprising (a) first and second opposed substrates, at least one of said substrates bearing an alignment coating, and each said substrate bearing at least one electrode so as to define one or a plurality of pixels; (b) a tilted smectic or induced tilted smectic liquid crystal composition disposed between said substrates; and (c) a pair of orthogonally disposed polarizers, each having a polarization axis, one said polarization axis being aligned with the zero field optical axis of a tilted smectic or induced tilted smectic mesophase of said liquid crystal composition; wherein said substrates are disposed so as to provide an alignment of said liquid crystal composition, said composition comprising (i) at least one chiral liquid crystal compound; and (ii) at least one achiral liquid crystal compound that is represented by the following formula:

$$R—M—N—(P)_a—OCH_2R_f \quad (I)$$

where M, N, and P are independently selected from the group consisting of aromatic, heteroaromatic, alicyclic, heteroalicyclic, substituted aromatic, substituted heteroaromatic, substituted alicyclic, and substituted heteroalicyclic rings, each said ring being fused or non-fused, and said rings being connected with each other by a covalent bond or an organic linking group; R is an alkyl group, an alkenyl group, an alkoxy group, or an alkoxy alkylene group; a is an integer of 0 or 1; and $R_f$ is a perfluoroether group; wherein said liquid crystal composition exhibits tristable switching.

2. The device of claim 1 wherein said alignment coating on said first substrate is the same as said alignment coating on said second substrate.

3. The device of claim 1 wherein said alignment coating on said first substrate is different from said alignment coating on said second substrate.

4. The device of claim 1 wherein at least one said alignment coating comprises a polyimide or polyamide film.

5. The device of claim 1 wherein said device is a passive matrix array device.

6. The device of claim 5 wherein said device has a positive memory margin and comprises individual pixels defined by the intersection of rows and columns of a conductor material.

7. The device of claim 1 wherein said device is an active matrix array device.

8. The device of claim 7 wherein said device comprises an array of transistors or diodes associated with said pixels.

9. The device of claim 1 wherein said liquid crystal composition exhibits a threshold electric field value to achieve 10 percent transmission ($E_{10}$) of less than about 10 V/μ.

10. The device of claim 1 wherein said liquid crystal composition has a polarization ($P_s$) of less than about 100 nC/cm$^2$ at the operating temperature range of said device.

11. The device of claim 1 wherein said liquid crystal composition has a memory margin (M) of 0 to −1.

12. The device of claim 1 wherein said liquid crystal composition exhibits V-shaped switching.

13. The device of claim 1 wherein said M, N, and P are each independently selected from the group consisting of

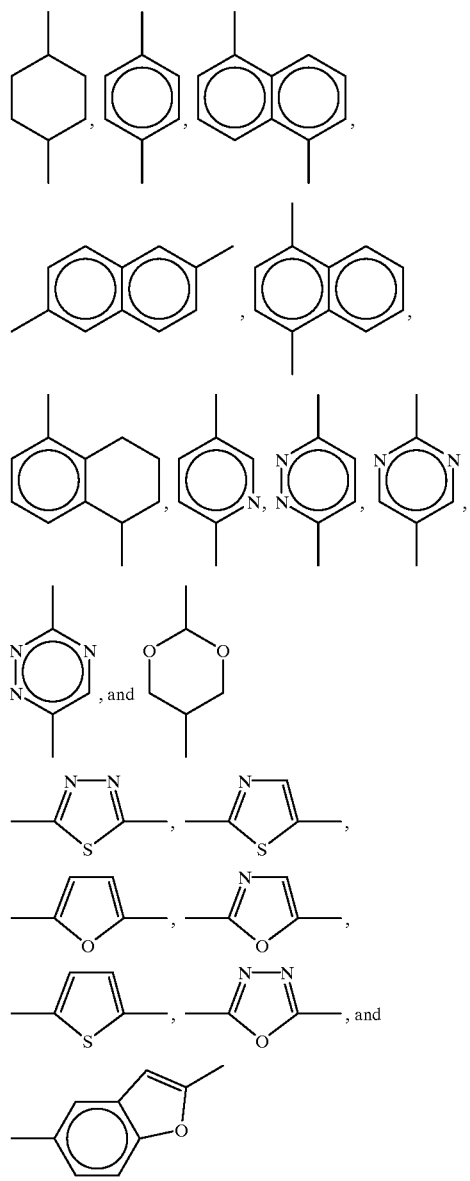

where one or more ring hydrogen atoms can be replaced with fluorine atoms.

14. The device of claim 1 wherein said R has from about 4 to about 12 carbon atoms.

15. The device of claim 1 wherein said $R_f$ has from about 5 to about 16 carbon atoms.

16. The device of claim 1 wherein said $R_f$ is represented by the formula $(C_xF_{2x}O)_zC_yF_{2y+1}$, where x is independently an integer of 1 to about 10 for each $(C_xF_{2x}O)$, y is an integer of 1 to about 10, and z is an integer of 1 to about 4.

17. The device of claim 16 wherein said z is an integer of 2 or 3.

18. The device of claim 1 wherein said achiral liquid crystal compound is represented by the formula:

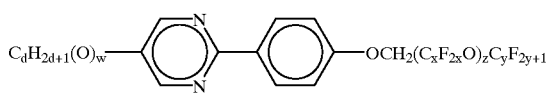

where d is an integer of about 4 to about 12; w is an integer of 0 or 1; x is independently an integer of 1 to about 10 for each $(C_xF_{2x}O)$; y is an integer of 1 to about 6; and z is an integer of 1 to about 4.

19. The device of claim 1 wherein said achiral liquid crystal compound is represented by one of the following formulas:

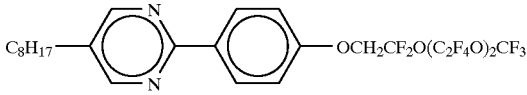
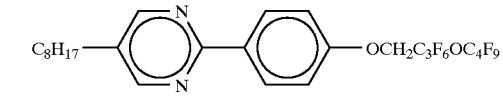
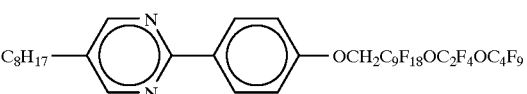
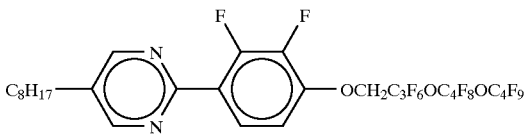
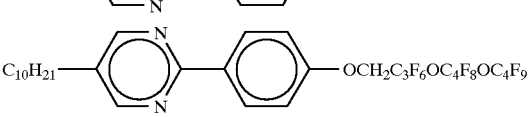

-continued

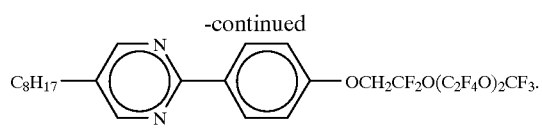

20. The device of claim 1 wherein said chiral liquid crystal compound is fluorinated.

21. The device of claim 20 wherein said chiral liquid crystal compound is a fluorine-containing liquid crystal compound comprising a chiral fluorochemical terminal portion optionally containing at least one catenary ether oxygen atom; a chiral or achiral hydrocarbon or hydrocarbon ether terminal portion; and a central core connecting said terminal portions.

22. The device of claim 21 wherein said chiral fluorochemical terminal portion is represented by the formula $$—D—R^*—D—R_f'$$ (II)

where $R^*$ is a cyclic or acyclic chiral moiety; $R_f'$ is fluoroalkyl, perfluoroalkyl, fluoroether, or perfluoroether; and each D is independently selected from the group consisting of a covalent bond, —C(=O)—O—$C_rH_{2r}$—, —O—$C_rH_{2r}$—, —O—(O=)C—$C_rH_{2r}$—, —C≡C—, —CH=CH—, —C(=O)—, —O-($C_sH_{2s}$O)$_t$-$C_rH_{2r}$—, —$C_rH_{2r}$—, -($C_sH_{2s}$O)$_t$-$C_rH_{2r}$—, —O—, —S—,

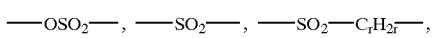
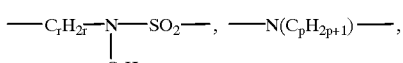

—$C_{2r}$—N—C(=O)—, —CH=N—, and combinations thereof, where one or more hydrogen atoms can optionally be replaced with fluorine, and where r and r' are independently integers of 0 to about 20, s is independently an integer of 1 to about 10 for each $(C_sH_{2s}O)$, t is an integer of 1 to about 6, and p is an integer of 0 to about 4.

23. The device of claim 22 wherein said chiral liquid crystal compound is represented by the formula $$R—M—N—(P)_a—D—R^*—D—R_f''$$ (III)

where M, N, and P are independently selected from the group consisting of aromatic, heteroaromatic, alicyclic, heteroalicyclic, substituted aromatic, substituted heteroaromatic, substituted alicyclic, and substituted heteroalicyclic rings, the individual rings being fused or non-fused, and the rings being connected with each other by a covalent bond or an organic linking group; R is an alkyl group, an alkenyl group, an alkoxy group, or an alkoxy alkylene group; a is an integer of 0 or 1; and $R_f''$ is perfluoroether.

24. The device of claim 23 wherein said M, N, and P are each independently selected from the group consisting of

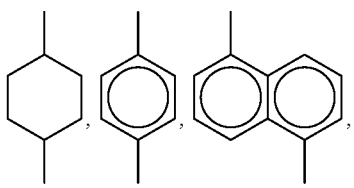

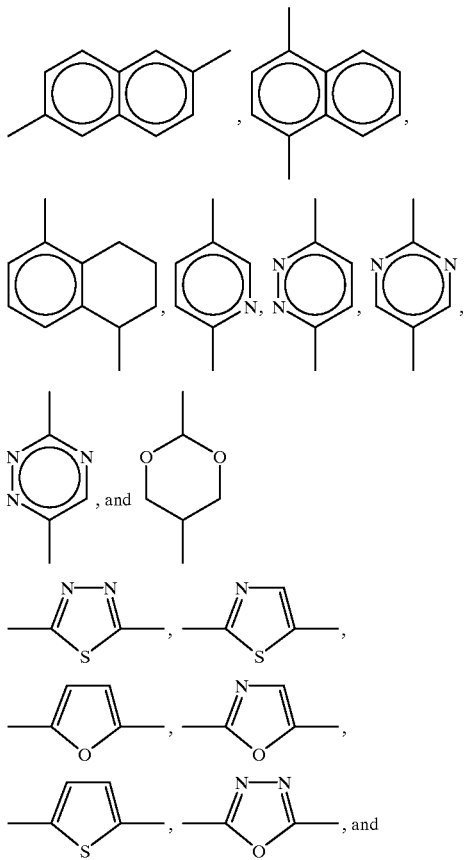

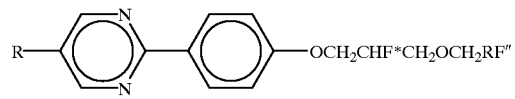

where one or more of the ring hydrogen atoms can be replaced with fluorine atoms; said R has from about 4 to about 12 carbon atoms; and said $R_f''$ is represented by the formula $(C_xF_{2x}O)_zC_yF_{2y+1}$, where x is independently an integer of 1 to about 10 for each $(C_xF_{2x}O)$, y is an integer of 1 to about 10, and z is an integer of 1 to about 4.

25. The device of claim 24 wherein said chiral liquid crystal compound is represented by the formula $$R \text{—} \underset{N}{\overset{N}{\bigcirc}} \text{—} \bigcirc \text{—} OCH_2CHF^*CH_2OCH_2RF'' \qquad (IV)$$

where one or more ring hydrogen atoms can be replaced with fluorine atoms.

26. The device of claim 21 wherein said chiral liquid crystal compound is represented by one of the following formulas:

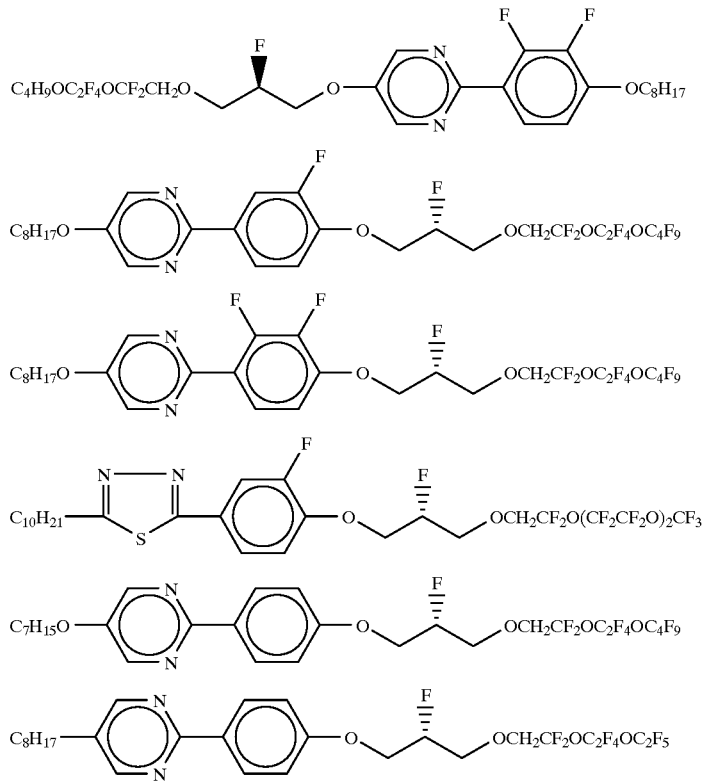

-continued

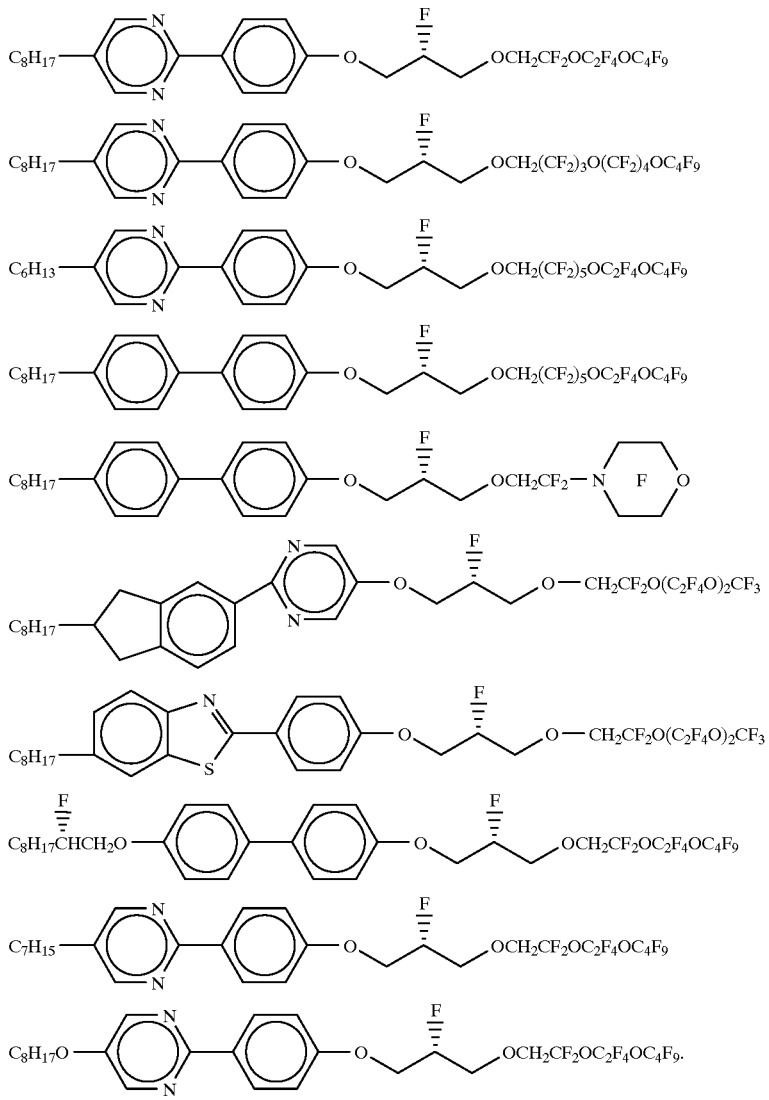

27. A tristable liquid crystal display device comprising (a) first and second opposed substrates, at least one of said substrates bearing an alignment coating, and each said substrate bearing at least one electrode so as to define one or a plurality of pixels; (b) a tilted smectic or induced tilted smectic liquid crystal composition disposed between said substrates; and (c) a pair of orthogonally disposed polarizers, each having a polarization axis, one said polarization axis being aligned with the zero field optical axis of a tilted smectic or induced tilted smectic mesophase of said liquid crystal composition; wherein said substrates are disposed so as to provide an alignment of said liquid crystal composition, said composition comprising (i) at least one fluorinated chiral liquid crystal compound; and (ii) at least one achiral liquid crystal compound that is represented by the following formula:

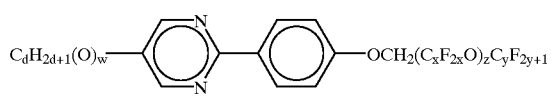

where d is an integer of about 4 to about 12; w is an integer of 0; x is independently an integer of 1 to about 10 for each $(C_xF_{2x}O)$; y is an integer of 1 to about 6; and z is an integer of 1 to about 4; wherein said liquid crystal composition exhibits tristable switching.

28. A method of driving a tristable liquid crystal display device comprising the step of applying a voltage to the liquid crystal display device of claim 1 comprising said liquid crystal composition, said voltage being sufficient to cause said zero field optical axis of said liquid crystal composition to shift from a zero field state toward a ferroelectric state, resulting in a net tilt in said zero field optical axis.

* * * * *

UNITED STATES PATENT AND TRADEMARK OFFICE
CERTIFICATE OF CORRECTION

PATENT NO.   : 6,084,649
DATED        : July 4, 2000
INVENTOR(S)  : Amano, Takashi It is certified that error appears in the above-identified patent and that said Letters Patent is hereby corrected as shown below:

Column 2,
Line 45, please delete "ahkenyl" and insert in the place thereof -- alkenyl --.
Line 47, please delete "perfluorcether" and insert in the place thereof
-- perfluoroether --.

Column 6,
Line 12, please delete "fluorocliemical" and insert in the place thereof
-- fluorochemical --.

Column 12,
Line 11, please delete "CYLOS" and insert in the place thereof -- CMOS --.

Column 13,
Line 43, please delete "threshold less" and insert in the place thereof -- thresholdless --.

Column 27,
Line 66, please delete "ferrDelectric" and insert in the place thereof -- ferroelectric --.

Signed and Sealed this

Twenty-first Day of May, 2002

Attest:

JAMES E. ROGAN
Attesting Officer    Director of the United States Patent and Trademark Office